(12) United States Patent
Geisner et al.

(10) Patent No.: US 9,498,720 B2
(45) Date of Patent: Nov. 22, 2016

(54) SHARING GAMES USING PERSONAL AUDIO/VISUAL APPARATUS

(75) Inventors: Kevin A Geisner, Mercer Island, WA (US); Stephen G Latta, Seattle, WA (US); Ben J Sugden, Woodinville, WA (US); Benjamin I Vaught, Seattle, WA (US);

(Continued)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 13/445,616

(22) Filed: Apr. 12, 2012

(65) Prior Publication Data

US 2013/0084970 A1    Apr. 4, 2013

Related U.S. Application Data

(63) Continuation-in-part of application No. 13/250,878, filed on Sep. 30, 2011, now abandoned.

(51) Int. Cl.
*A63F 13/65* (2014.01)
*A63F 13/213* (2014.01)
(Continued)

(52) U.S. Cl.
CPC ............... *A63F 13/65* (2014.09); *A63F 13/02* (2013.01); *A63F 13/10* (2013.01); *A63F 13/213* (2014.09);
(Continued)

(58) Field of Classification Search
CPC ............... G09G 5/00; G06F 3/01; A63F 9/24; A63F 13/00; A63F 13/10; A63F 9/00;
(Continued)

(56) References Cited

U.S. PATENT DOCUMENTS 7,311,608 B1 * 12/2007 Danieli .................. A63F 13/12
463/42
7,693,702 B1    4/2010 Kerner et al.
(Continued)

OTHER PUBLICATIONS

Sudipta N. Sinha, "Interactive 3D Architectural Modeling from Unordered Photo Collections," in Proceedings of ACM SIGGRAPH Asia 2008, vol. 27 Issue 5, Article No. 159, Dec. 2008.*

(Continued)

*Primary Examiner* — Gregory J Tryder
*Assistant Examiner* — Michael Le
(74) *Attorney, Agent, or Firm* — Dan Choi; Micky Minhas

(57) ABSTRACT

A game can be created, shared and played using a personal audio/visual apparatus such as a head-mounted display device (HMDD). Rules of the game, and a configuration of the game space, can be standard or custom. Boundary points of the game can be defined by a gaze direction of the HMDD, by the user's location, by a model of a physical game space such as an instrumented court or by a template. Players can be identified and notified of the availability of a game using a server push technology. For example, a user in a particular location may be notified of the availability of a game at that location. A server manages the game, including storing the rules, boundaries and a game state. The game state can identify players and their scores. Real world objects can be imaged and provided as virtual objects in the game space.

20 Claims, 28 Drawing Sheets

(75) Inventors: Alex Aben-Athar Kipman, Redmond, WA (US); Kathryn Stone Perez, Kirkland, WA (US); Ryan L Hastings, Seattle, WA (US); Jason Scott, Kirkland, WA (US); Darren A Bennett, Seattle, WA (US); John Clavin, Seattle, WA (US); Daniel McCulloch, Kirkland, WA (US)

(51) Int. Cl.
*A63F 13/98* (2014.01)
*A63F 13/40* (2014.01)
*A63F 13/216* (2014.01)
*A63F 13/30* (2014.01)

(52) U.S. Cl.
CPC .............. *A63F 13/12* (2013.01); *A63F 13/216* (2014.09); *A63F 2300/1031* (2013.01); *A63F 2300/301* (2013.01); *A63F 2300/308* (2013.01)

(58) Field of Classification Search
CPC ............ A63F 3/04; A63F 13/02; A63F 13/12; A63F 2300/301; A63F 2300/308; A63F 2300/1031
USPC ........ 345/619, 419, 156–159, 629, 630–634, 345/8; 715/700; 359/630–632; 463/7, 31, 463/42, 43, 59, 29
See application file for complete search history.

(56) References Cited

U.S. PATENT DOCUMENTS

| | | | |
|---|---|---|---|
| 8,432,489 B2 | 4/2013 | Arseneau et al. | |
| 2004/0229701 A1* | 11/2004 | Gavin | 463/43 |
| 2005/0168403 A1 | 8/2005 | Ebersole et al. | |
| 2006/0105838 A1* | 5/2006 | Mullen | A63F 13/00 463/31 |
| 2007/0024438 A1* | 2/2007 | Chen | 340/539.11 |
| 2007/0173265 A1* | 7/2007 | Gum | G01S 5/0027 455/456.1 |
| 2007/0202953 A1* | 8/2007 | Taninami | A63F 13/12 463/42 |
| 2009/0099924 A1* | 4/2009 | Lensch | G06Q 10/101 705/14.13 |
| 2009/0271718 A1* | 10/2009 | Balaishis | G06Q 40/06 715/760 |
| 2010/0010366 A1* | 1/2010 | Silberstein | A61B 3/113 600/544 |
| 2010/0131865 A1 | 5/2010 | Ackley et al. | |
| 2010/0238161 A1 | 9/2010 | Varga et al. | |
| 2010/0261526 A1* | 10/2010 | Anderson | G06F 3/017 463/31 |
| 2010/0287485 A1* | 11/2010 | Bertolami et al. | 715/764 |
| 2011/0141254 A1 | 6/2011 | Roebke et al. | |
| 2011/0151955 A1 | 6/2011 | Nave | |
| 2011/0221656 A1* | 9/2011 | Haddick | G02B 27/017 345/8 |
| 2011/0221672 A1 | 9/2011 | Osterhout et al. | |
| 2011/0221793 A1 | 9/2011 | King, III et al. | |
| 2011/0270135 A1 | 11/2011 | Dooley et al. | |
| 2013/0065692 A1* | 3/2013 | Aronzon et al. | 463/42 |

OTHER PUBLICATIONS

Barakonyi, et al., "MonkeyBridge: Autonomous Agents in Augmented Reality Games", In Proceedings of the ACM SIGCHI International Conference on Advances in Computer Entertainment Technology, vol. 265, Jun. 15-17, 2005, pp. 172-175.

Lester, "Red Bull Racing —Amazing Augmented Reality Game", Published on: Mar. 21, 2011, Available at: http://www.augmentedplanet.com/2011/03/red-bull-racing-amazing-augmented-reality-game/.

Weilguny, Markus, "Design Aspects in Augmented Reality Games," Diploma Thesis, Upper Austria University of Applied Sciences Hagenberg Master of Science in Engineering Program, Jun. 2006, 156 pages.

Non-final Office Action dated Jul. 26, 2013, U.S. Appl. No. 13/250,878, filed Sep. 30, 2011.

Final Office Action dated Feb. 4, 2014, U.S. Appl. No. 13/250,878, filed Sep. 30, 2011.

Response to Office Action dated Oct. 17, 2013, U.S. Appl. No. 13/250,878, filed Sep. 30, 2011.

Response to Final Office Action dated May 2, 2014, U.S. Appl. No. 13/250,878, filed Sep. 30, 2011.

Non-final Office Action dated May 21, 2014, U.S. Appl. No. 13/250,878, filed Sep. 30, 2011.

Response to Office Action dated Feb. 14, 2015, U.S. Appl. No. 13/250,878, filed Sep. 30, 2011.

Final Office Action dated Nov. 21, 2014, U.S. Appl. No. 13/250,878, filed Sep. 30, 2011.

* cited by examiner

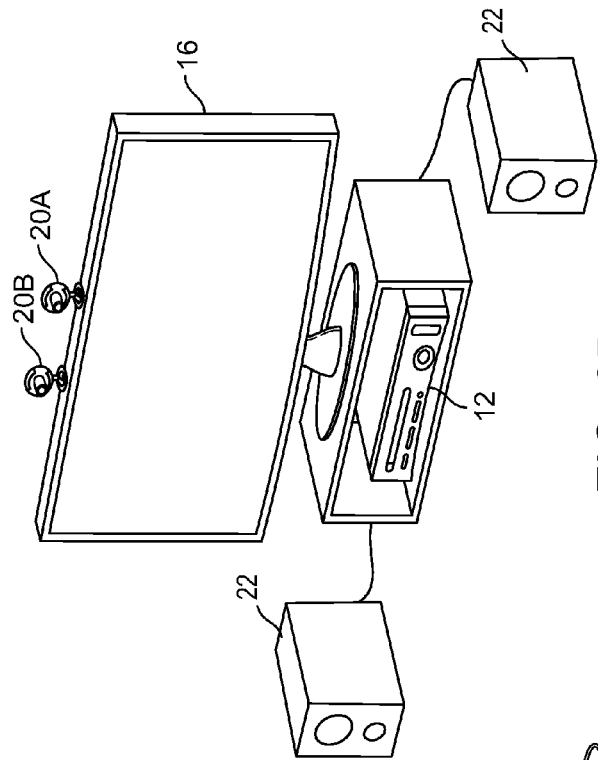
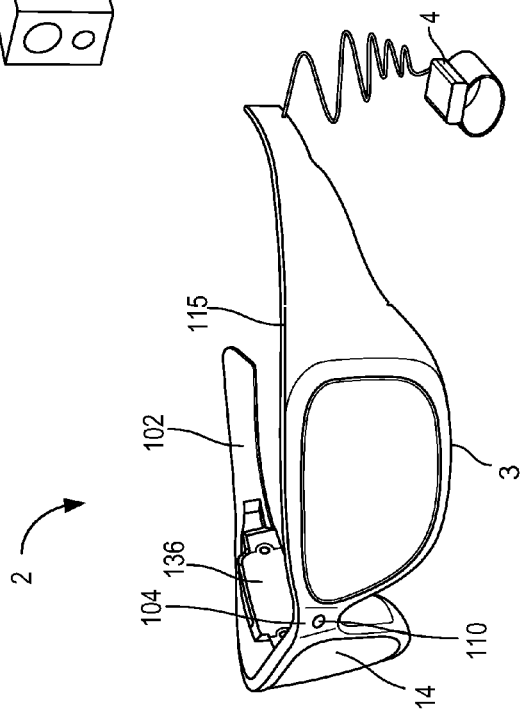
FIG. 2B
FIG. 2A

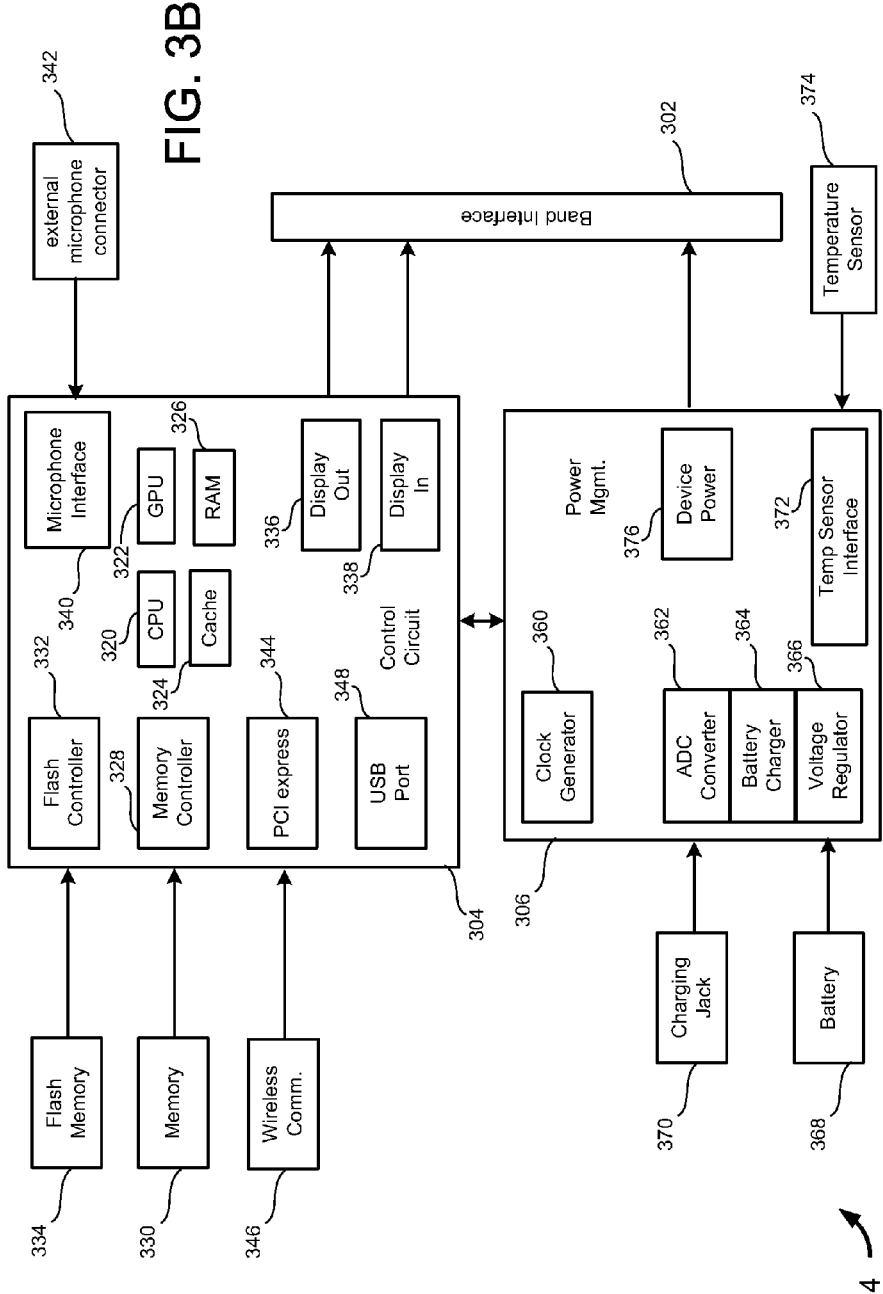

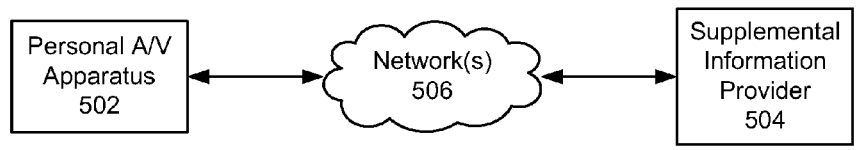
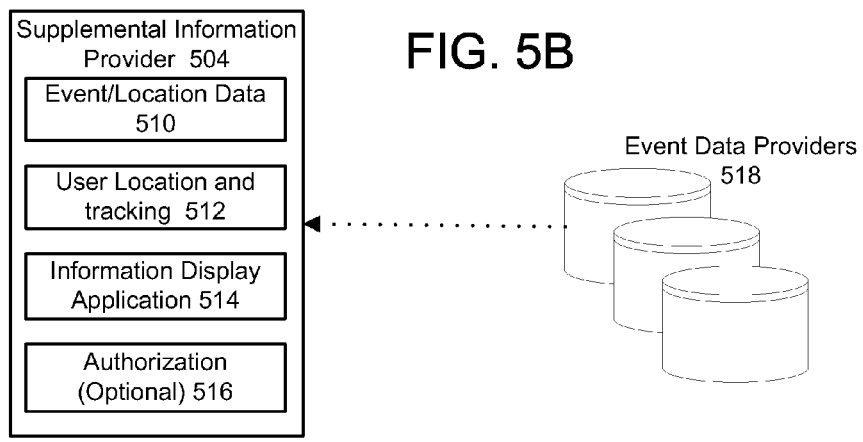
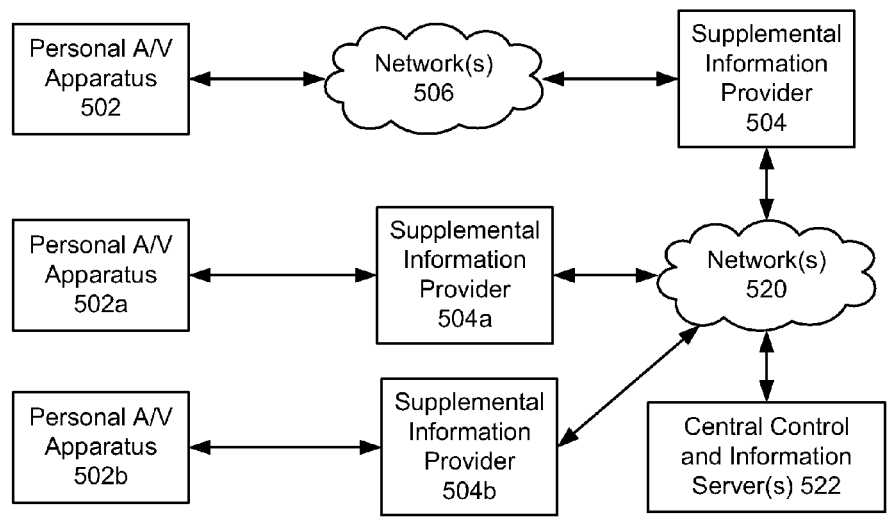

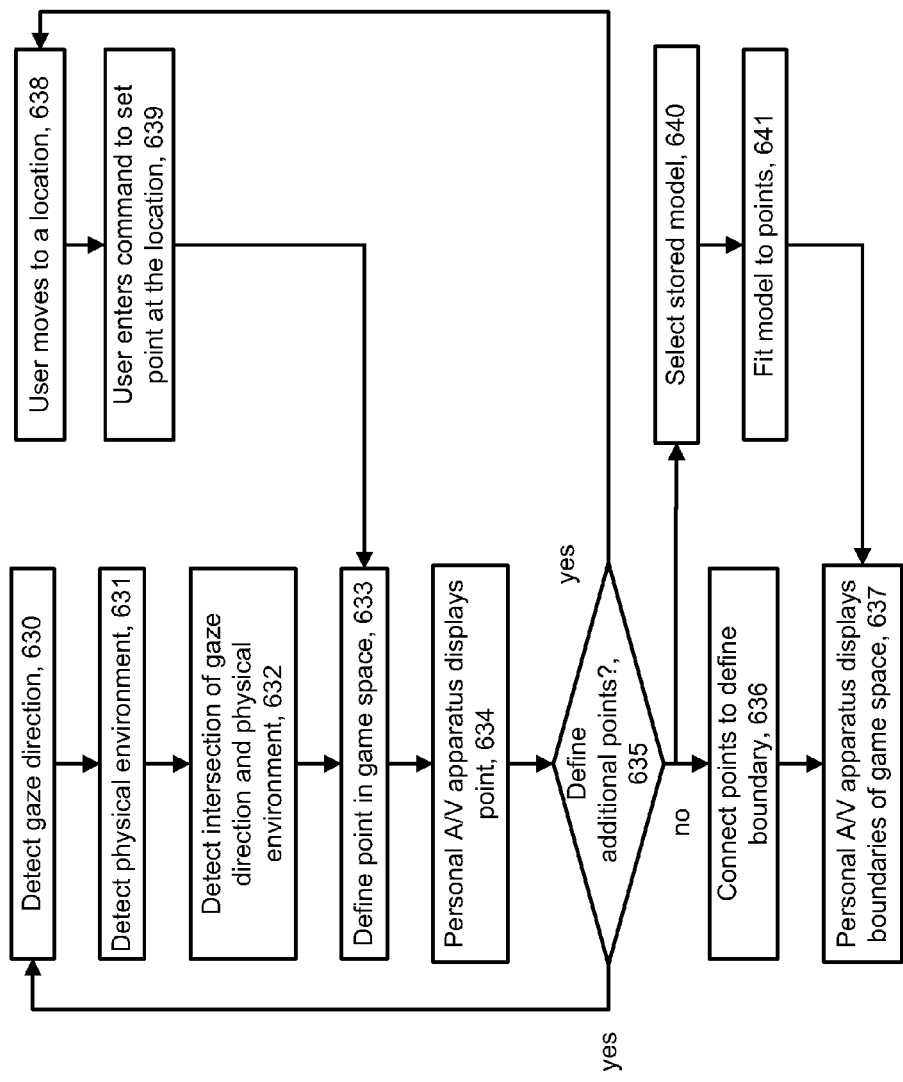

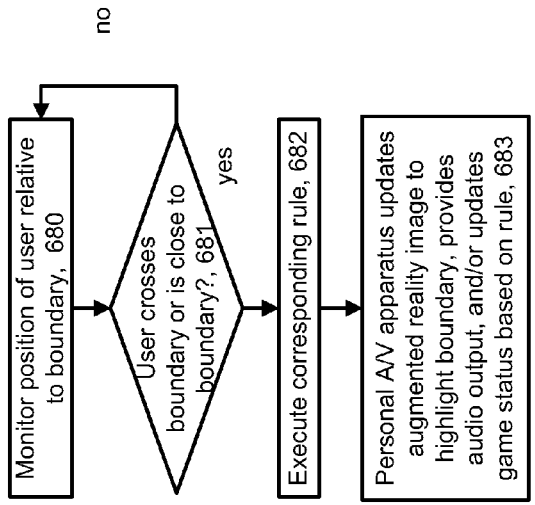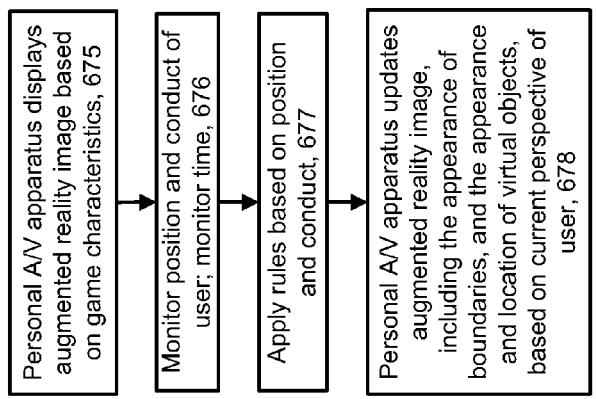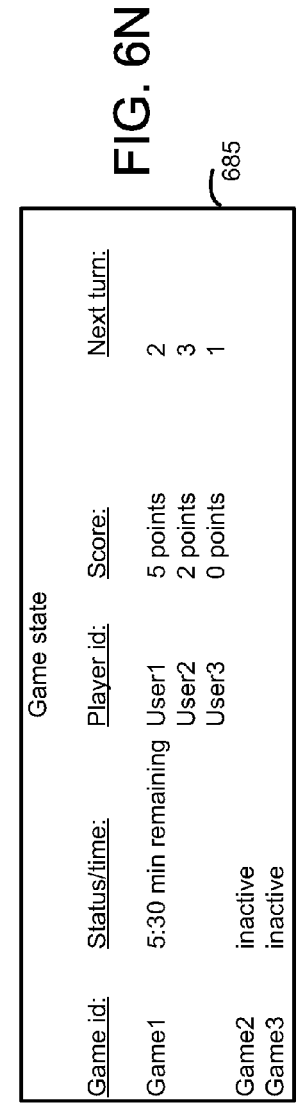

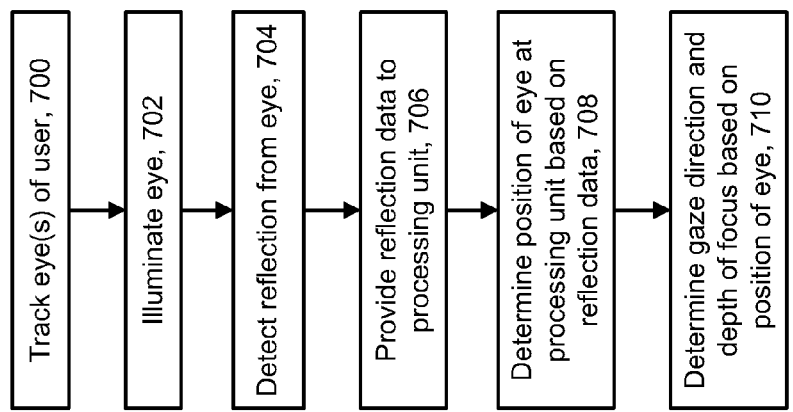

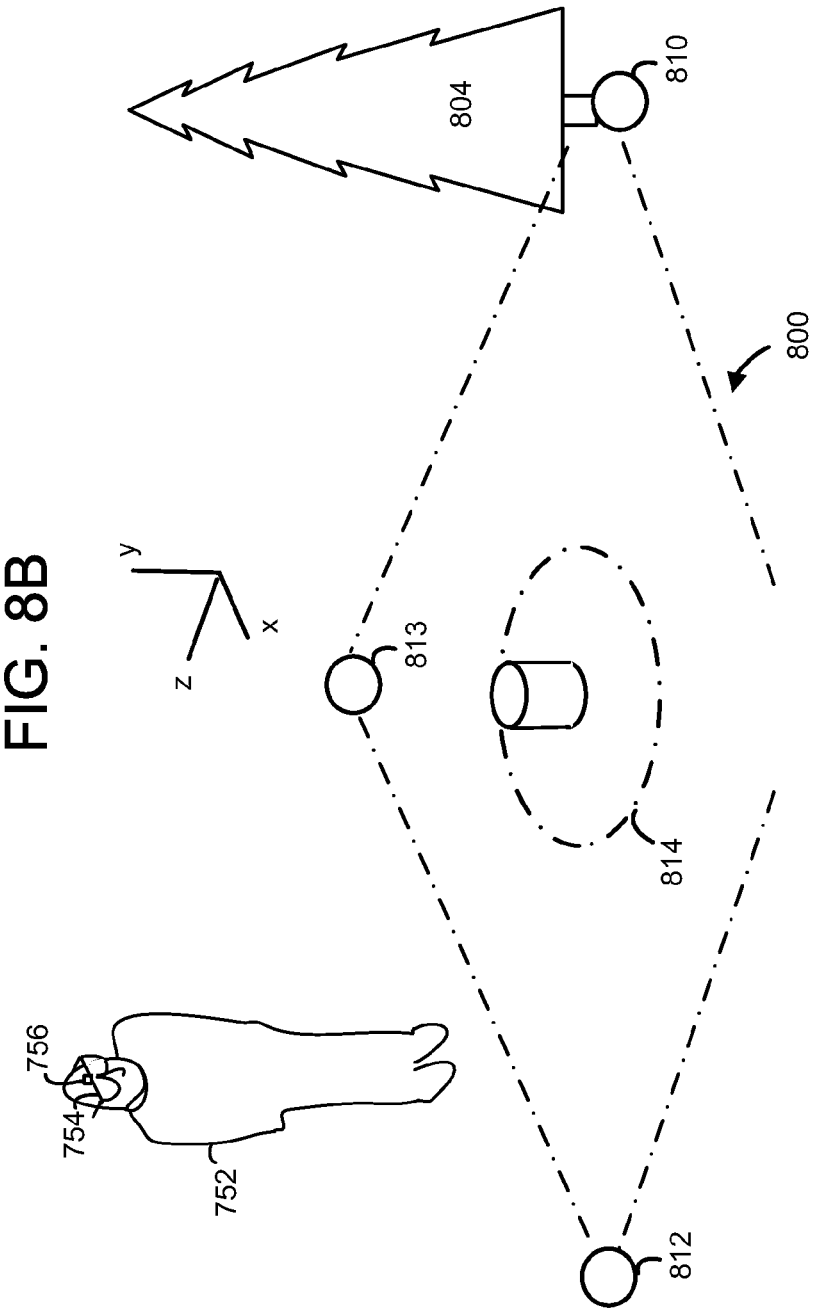

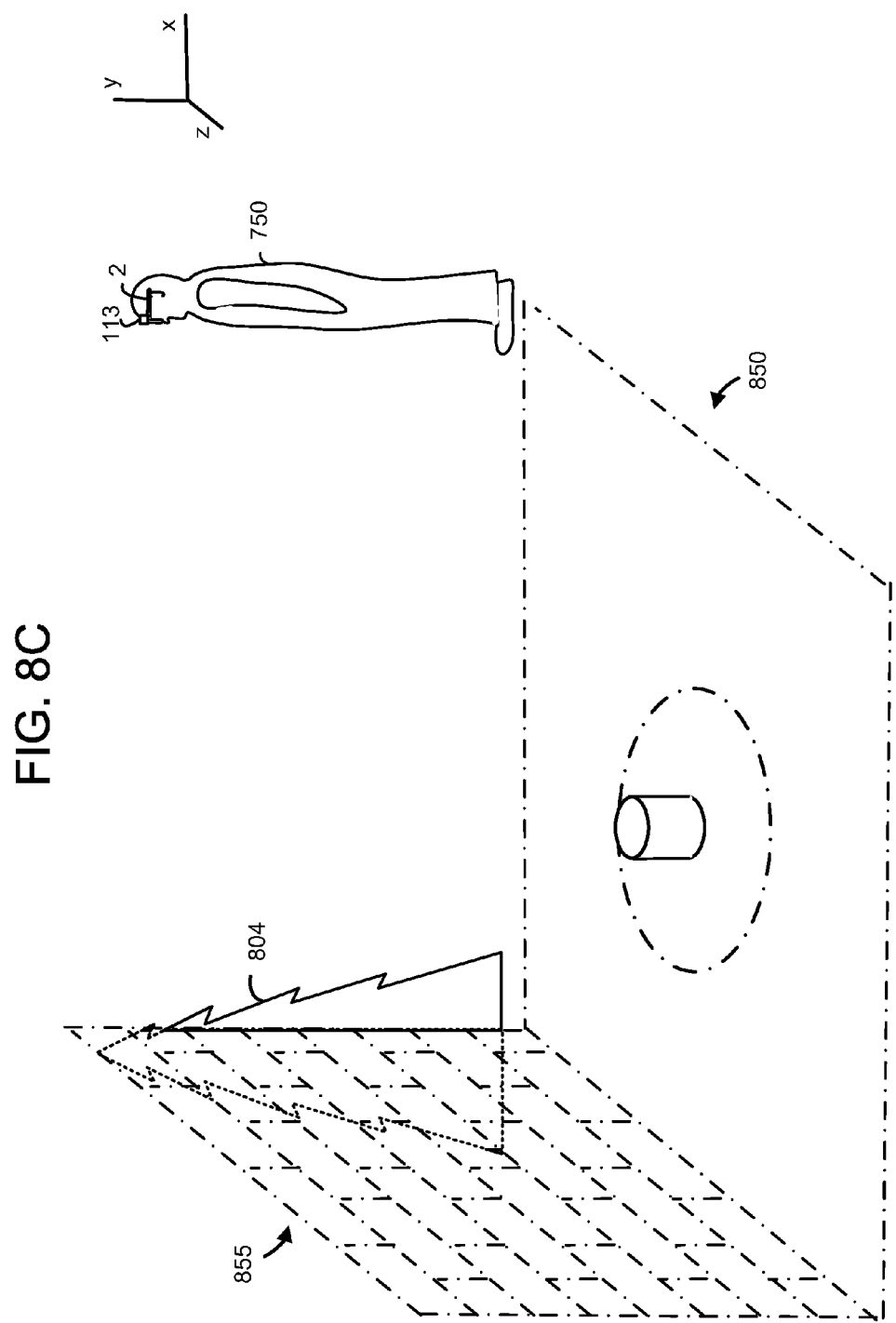

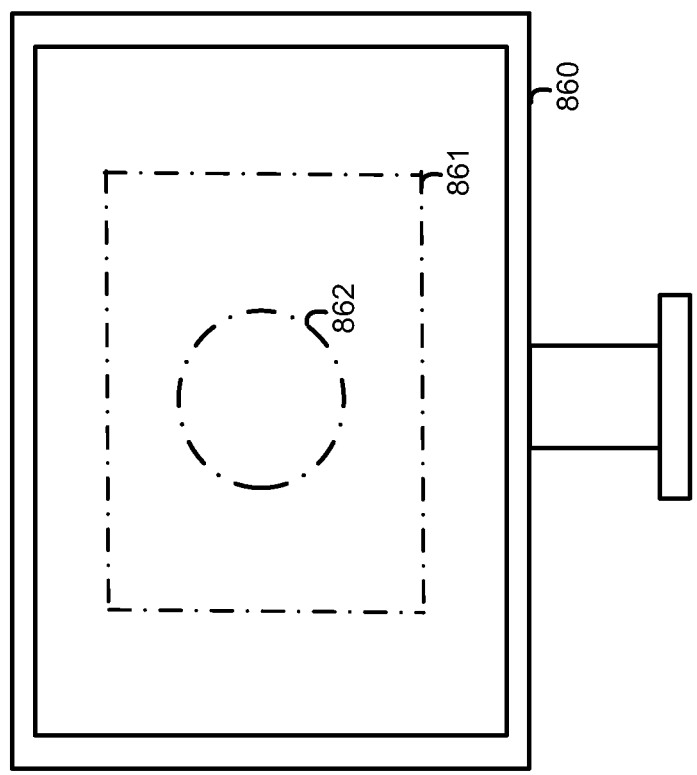

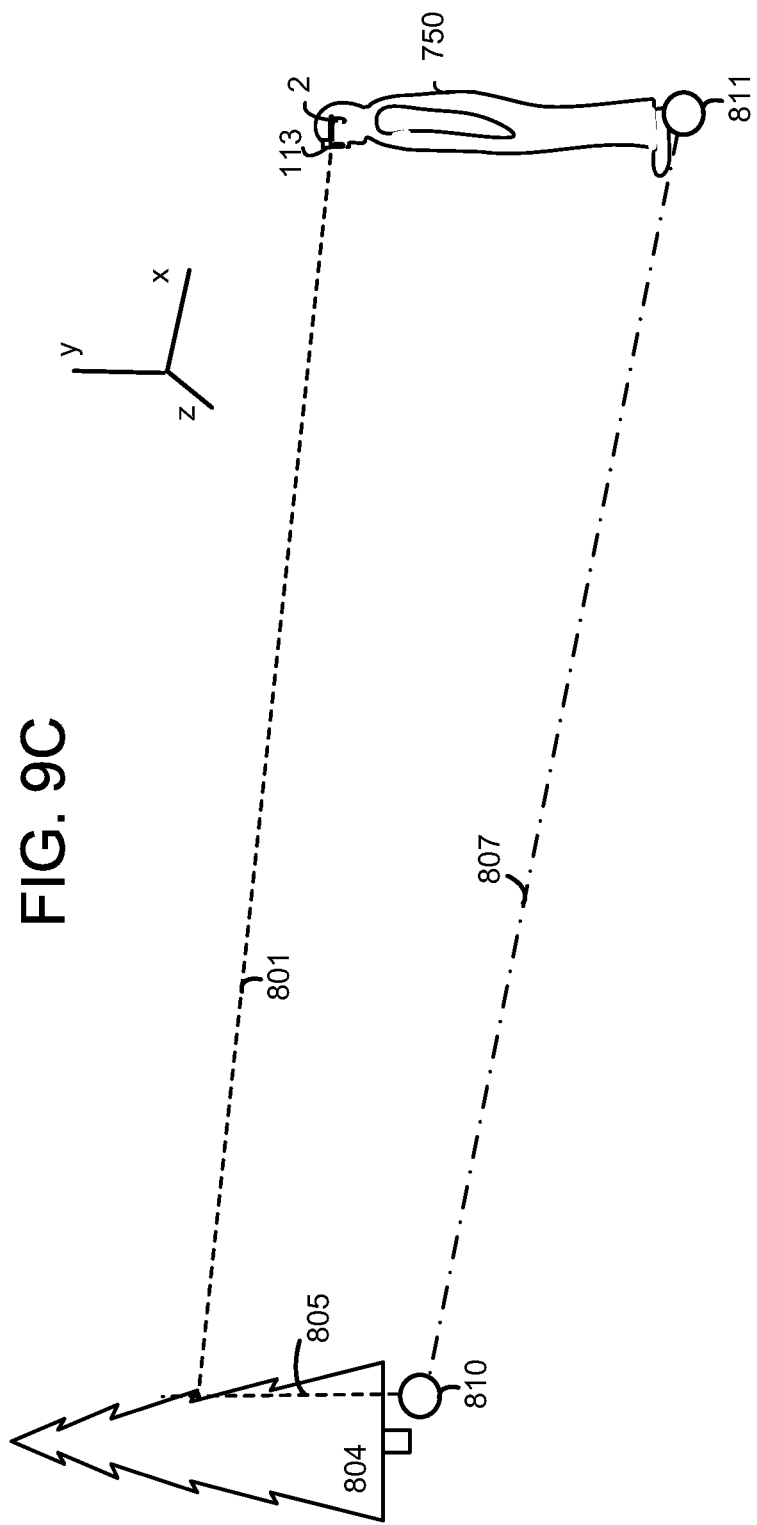

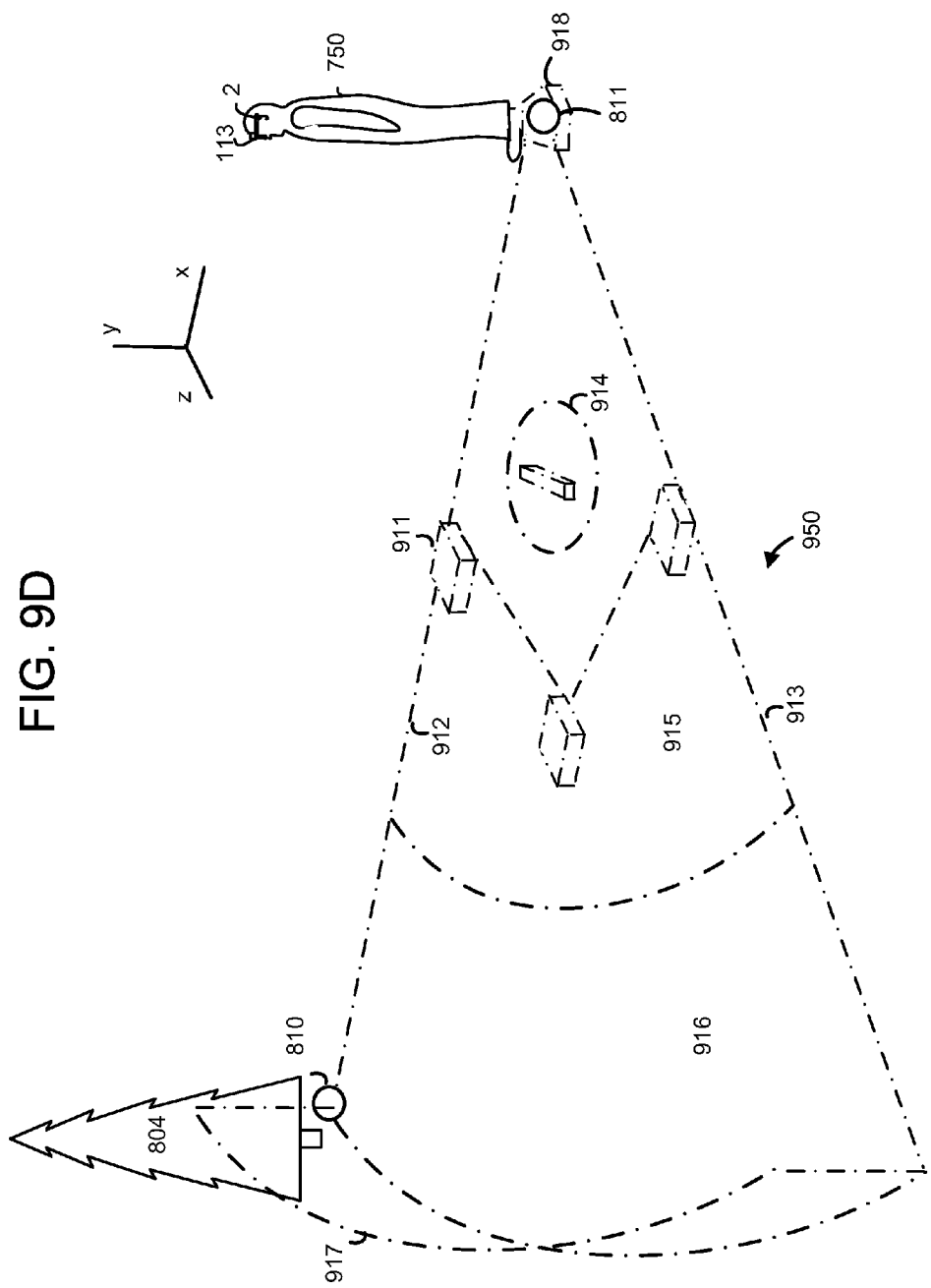

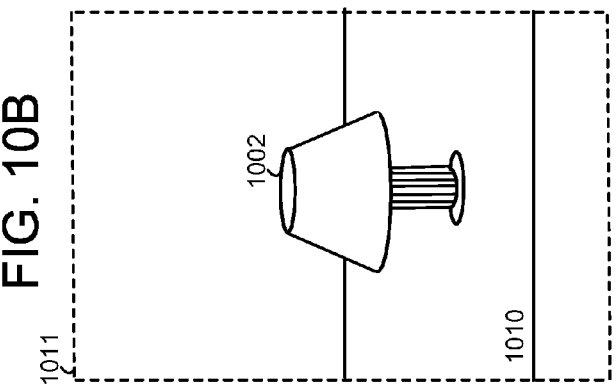
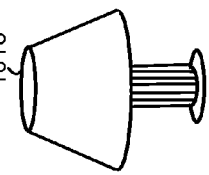
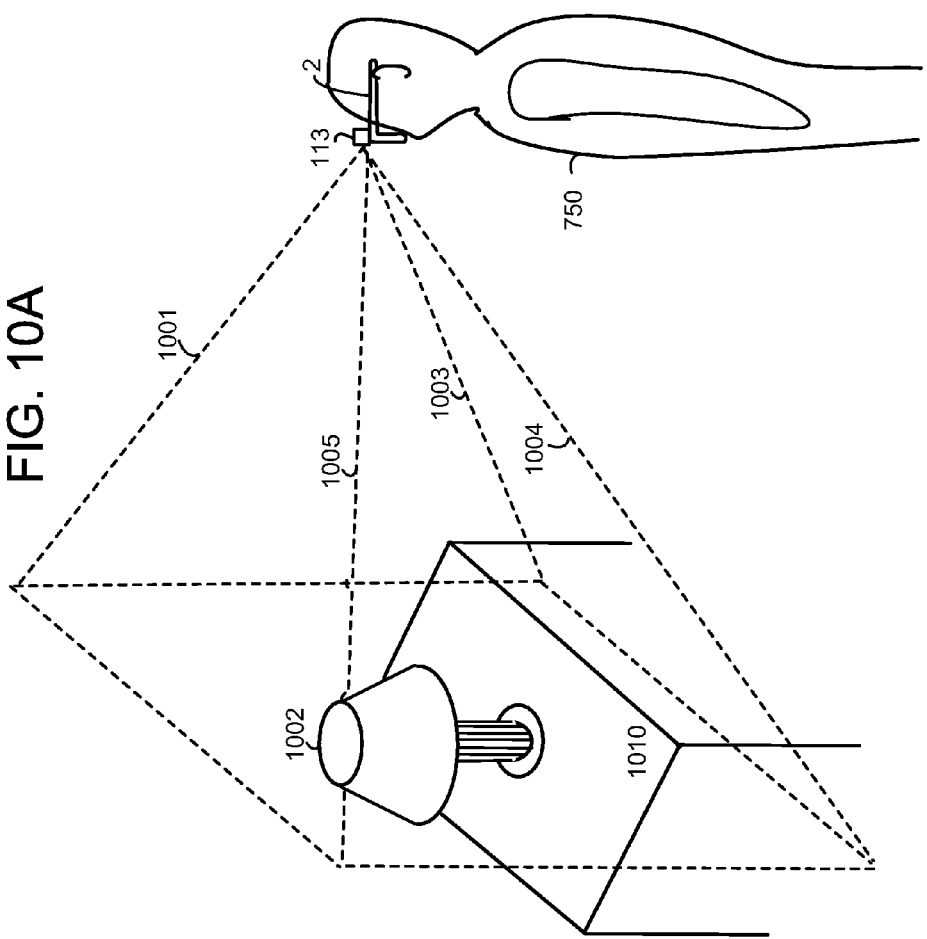
FIG. 10A
FIG. 10B
FIG. 10C

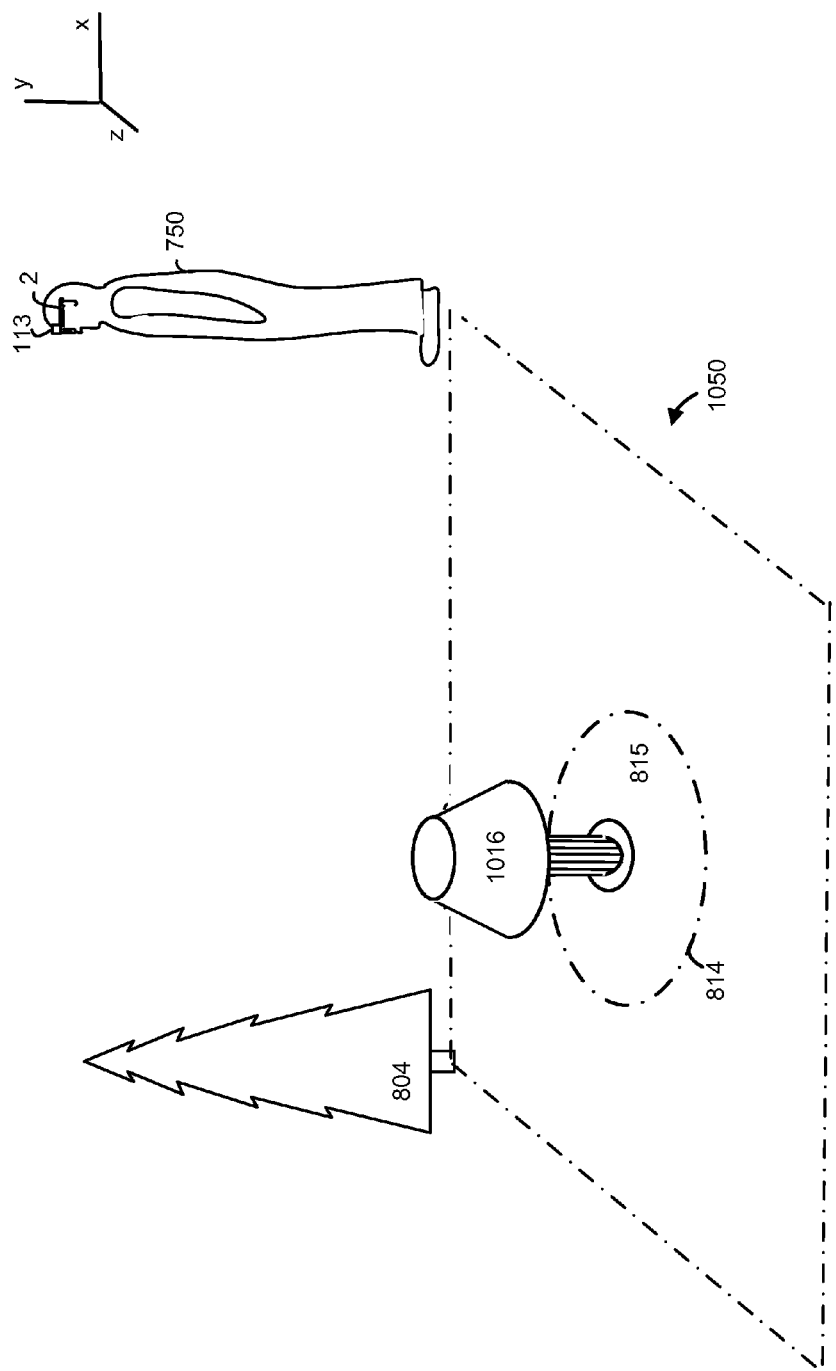

SHARING GAMES USING PERSONAL AUDIO/VISUAL APPARATUS

CROSS-REFERENCE TO RELATED APPLICATIONS

This is a continuation-in-part application of U.S. patent application Ser. No. 13/250,878, titled "Personal Audio/Visual System," to K. Stone-Perez et al., filed Sep. 30, 2011 and published as US 2013/0083003 on Apr. 4, 2013, and incorporated herein by reference.

BACKGROUND

Augmented reality is a technology that allows virtual imagery to be mixed with a real world physical environment. For example, an augmented reality system can be used to insert an image of a dinosaur into a user's view of a room so that the user sees a dinosaur walking in the room. In many cases, augmented reality is accomplished using an apparatus that can be viewed by one person or a small number of people. Therefore, the augmented reality system can provide a personalized experience. There is an opportunity to use augmented reality in various entertainment and task situations.

SUMMARY

Technology described herein provides various embodiments for implementing an augmented reality system that can assist a user in creating, sharing and playing a game using a personal audio/visual (AN) apparatus such as a head-mounted display device (HMDD). The game can be created by a user using standard and/or custom, user-defined rules. A game space of the game can have boundaries which are defined by a gaze direction of the user, by the user's location or by a model of a physical game space such as an instrumented court, e.g., a basketball court, a baseball field, and so forth. A user can select other users who can participate in the game. Once the rules and boundaries are created, they can be shared with other users using a server push technology. For example, a user entering a particular location can be informed of the availability of a game by a server and can choose to join in. While playing the game, users view the game space as augmented reality images. Users can be notified by visual and/or audible feedback when they are near a boundary, or when another event of significance occurs, such as a point being scored or a time period ending. A state of the game can be saved by the server for subsequent access, such as to continue the game at a later date.

In one approach, a method for sharing a game includes defining a characteristic of a game using a sensor of a first head-mounted display device, where the characteristic is defined with respect to a physical environment of a user of the first head-mounted display device. For example, the characteristic can be a location of the user in the physical environment, a rule of the game, a boundary of the game, a desired (maximum/minimum) number of players, player roles and a model of a game space. The sensor can be, e.g., a visible light camera, a depth camera and/or and a radio frequency (RF) signal sensor. The method further includes sharing the game, including the characteristic of the game, with at least a user of a second head-mounted display device via a network. For example, the game characteristics can be uploaded to a server and pushed out to another user if one or more criterion is met, e.g., regarding the other user's identity or location. The game characteristics can alternatively be sent directly from one user to another. The other user can choose to join in the game, in which case the user's personal A/V apparatus downloads the game characteristics and displays the game space. During play, a user's position and conduct can be monitored in the game space, such as to assign points, to notify the user that he or she is close to, or has crossed a boundary, or to modify the appearance and/or location of virtual objects with which the user interacts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is an example configuration of one embodiment of the HMDD 2 of FIG. 1.

FIG. 2B is an example configuration of one embodiment of the hub computing system 12 and image capture devices 20A and 20B of FIG. 1.

FIG. 3B is a block diagram of one embodiment of hardware and software components of an auxiliary processing unit 4 of the personal A/V apparatus 2 of FIG. 2A.

FIG. 5A is a block diagram of one embodiment of a system used to provide a customized experience.

FIG. 5B is a block diagram of another embodiment of a system used to provide a customized experience.

FIG. 5C is a block diagram of another embodiment of a system used to provide a customized experience.

FIG. 6C is a flowchart describing example details for defining boundaries of a game space, in connection with step 602 of FIG. 6A.

FIG. 6L is a flowchart describing example details for playing a game, in connection with step 618 of FIG. 6A.

FIG. 6M is a flowchart describing example details for monitoring boundaries, in connection with step 620 of FIG. 6A.

FIG. 6N provides an example database record for storing a game state, in connection with steps 622 and 624 of FIG. 6A.

FIG. 7 depicts a process for tracking a user's gaze direction and depth of focus such as for use in step 602 of FIG. 6A, and step 630 of FIG. 6C.

FIG. 8B depicts an augmented reality image of the game space 800 of FIG. 8A from a perspective of the user 750.

FIG. 8C depicts a game space 850 which is based on the game space 800 of FIG. 8A with the addition of a wall 855.

FIG. 8D depicts a display screen of a computing device which provides an alternate way for the user to create the game space 800 of FIG. 8A.

FIG. 9C depicts an example scenario for defining the points 810 and 811 of FIG. 8A, in connection with step 633 in FIG. 6C.

FIG. 9D depicts an example augmented reality image 950 of the model 910 of a game space which is fitted to a physical environment based on the points 810 and 811, in connection with step 641 of FIG. 6C.

FIG. 10A depicts an example scenario in which a user obtains an image of an object in a physical environment, in connection with step 650 of FIG. 6E.

FIG. 10B depicts an image 1011 of the object 1002 of FIG. 10A.

FIG. 10C depicts a virtual object 1016 based on the object 1002 of FIG. 10B, in connection with step 651 of FIG. 6E.

FIG. 10D depicts a game space 1050 which is based on the game space 800 of FIG. 8A, with the virtual object 1016 replacing the can 816.

DETAILED DESCRIPTION

Figure 1:
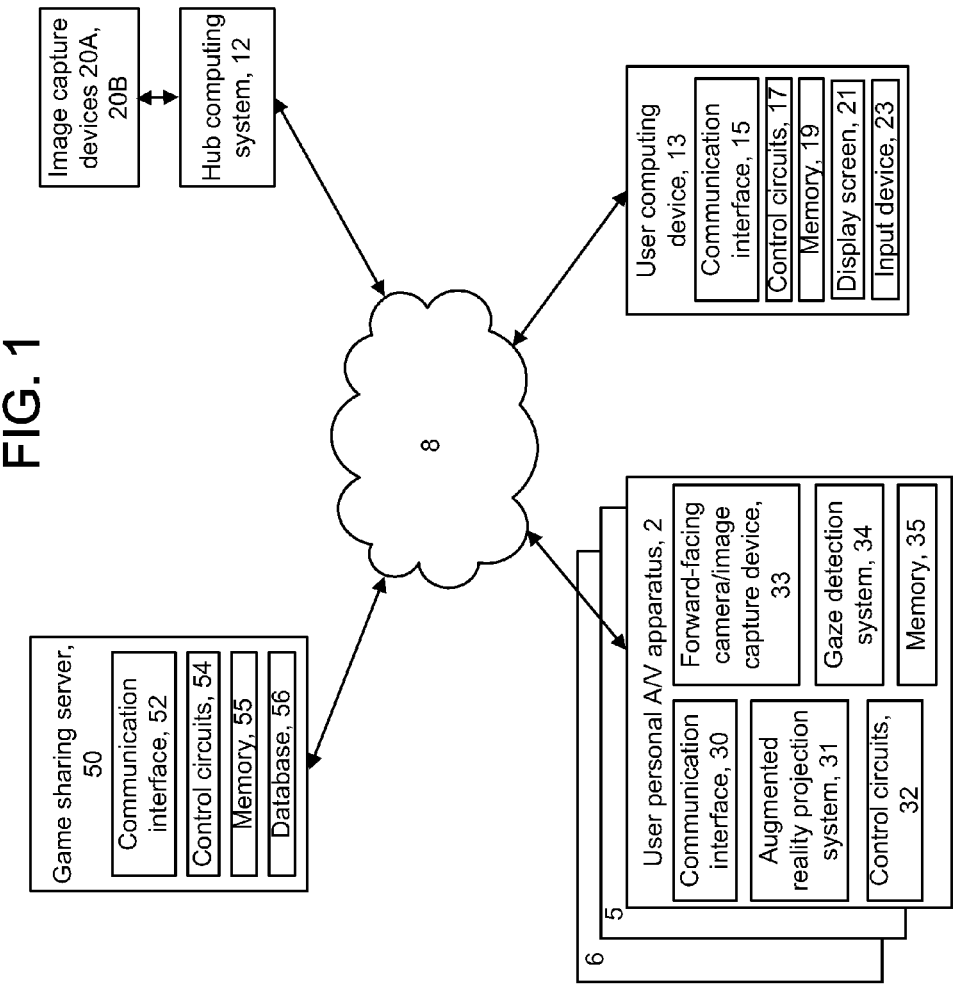
FIG. 1 depicts a system in which a user creates, shares and plays a game.

The technology described herein includes a see-through, near-eye, mixed reality display device for assisting a user in creating, sharing and playing a game. A game can include, e.g., an amusement or pastime, such as children's games, or an activity involving skill, chance, or endurance. A game can be played for educational or training purposes. A game is played by one or more persons.

A personal A/V apparatus allows a user to experience a game by viewing augmented reality images of a virtual game space in a physical environment such as a paved or grassy open area, an area within one's home, an area encompassing several blocks and so forth. For example, boundaries of the game space can be displayed as lines or other surfaces which appear to be registered or fixed to the physical environment. A game space can have horizontal as well as vertical dimensions. Virtual objects can also be incorporated into the game space. It would be desirable to allow users who do not have special knowledge of software techniques to be able to easily create and share games. It would also be desirable to facilitate the sharing of games such as by using push techniques at a server to inform users of the availability of games and/or to transmit games to users.

Techniques provided herein allow a user to define rules and a configuration of a game. In some cases, standard rules for a game are adopted and need not be defined by the user. In other cases, the user defines customized rules. A standard configuration of a game can also be adopted, such as from a template, or a customized configuration can be defined, such as by modifying a template or defining boundary points. For example, a standardized game template can provide a model of the boundary lines and features (e.g., bases, pitcher's mound, infield and outfield) of a standard baseball field. Standardized rules can also be adopted regarding, e.g., the number of players, the number of outs in an inning and the number of innings. A user could modify the configuration of the game space such as by deciding to have three bases instead of four, or by removing the outfield. A user could change the rules by having two outs per inning instead of three.

The user can position the model at a desired location in a physical environment, and share this location with other users. Users playing the game will see the boundary lines and features as augmented reality images which are generated by their personal A/V apparatus based on their own perspective of the game. Users may also see another user with a virtual object such as a bat. A virtual object can have behaviors which are appropriate to the game.

Boundary points of a game space can be defined in different ways. In one approach, a gaze direction of the user is used to determine a gazed-upon point in a physical environment, and this point is taken as a point on a boundary. Boundary lines can be created by defining and joining multiple points. A point by itself could also be a location of interest and not necessarily part of a boundary line. A user could also move to different locations in an area to define points in the game space, relying on a location detection capability of the personal A/V apparatus. In another approach, a user obtains an image of an instrumented court, and uses this to provide a model for the game space. For example, a camera-captured image of a volleyball court can be taken and processed to identify the boundary lines which are painted lines on a floor, for instance. An instrumented court could be any area that is already premeasured or predefined, such as a regulation size basketball court, volleyball court, baseball field and so forth. A game space can be created which matches the instrumented court.

A user who defines a game may be the owner of the game and have the ability to define which other players can participate. Roles of the other players can also be set.

Once the characteristics of a game are defined, such as the rules and boundaries, they can be uploaded to a game sharing server as a game definition, in one approach. The server manages the game, including storing the characteristics and a game state. The game state can identify players and their scores or other status.

Various other features can be provided which enhance the experience of the user of a personal A/V apparatus.

FIG. 1 depicts a system in which a user creates, shares and plays a game. The system includes one or more networks 8 by which a number of computing devices can communicate with one another. The network can include, e.g., WI-FI® (IEEE 802.11, a type of wireless local area network), BLUETOOTH® (IEEE 802.15.1, an open wireless protocol for exchanging data over short distances from fixed and mobile devices, creating personal area networks or piconets), infrared (e.g., IrDA® or INFRARED DATA ASSOCIATION® standard, a communications protocol for short range exchange of data over infrared light such as for use in personal area networks), cellular (e.g., Global System for Mobile communication (GSM) signals which are emitted from cell phone antennas), or other wireless communication means.

The system allows communication among one or more computing devices of users (such as personal A/V apparatuses 2, 5 and 6 and computing device 13) and one or more other computing devices which assist the users in creating, sharing and playing a game.

For example, a game sharing server 50 can store data regarding game characteristics and game status. See, e.g., the database records of FIGS. 6H and 6N for examples. The game sharing server 50 includes a communication interface 52, control circuits 54, a memory 55 and a database 56 which can store records described further below.

The hub computing system 12 and image capture devices 20A and 20B can provide content and processing capabilities for the personal A/V apparatuses 2, 5 and 6, as well as provide other features such as discussed in connection with FIG. 2B, 4A and 4B.

The personal A/V apparatus 2, for instance, can be used by a user who creates, shares and/or plays a game. The personal A/V apparatus is a type of computing device such as an HMDD, and can include components such as a communication interface 30, an augmented reality projection system 31, control circuits 32, one or more forward-facing cameras/image capture devices 33 (e.g., cameras which capture a room or other physical environment of the user), a gaze detection system 34 (detecting a gaze direction of the user) and one or more memory components 35. See also FIG. 2A, 3A and 3B which provide further details. Similar personal A/V apparatuses 5 and 6 of other users, such as players in a game, can also be provided.

A user computing device 13 can also be used by a user, and includes a communication interface 15, control circuits 17, a memory 19, a display screen 21 and an input device 23.

For example, the computing device may be used to create or modify game templates as discussed, e.g., in connection with FIG. 8D.

Generally, the communication interfaces allow communication between computing devices. The control circuits provide control of hardware and/or software of the respective computing devices. For example, the control circuits can include one or more processors which execute instructions stored on one or more tangible, non-transitory processor-readable storage devices for performing processor- or computer-implemented methods as described herein. The memories can store the instructions as code, and can provide the processor-readable storage devices. The display screen display information to the users of the respective computing devices and the input devices receive control inputs from the users. The databases and/or memories can provide data stores or sources which contain data which is accessed to perform the techniques described herein.

The personal A/V apparatus allows the user to view the physical environment with augmented reality images superimposed over it. The augmented reality images can include boundaries of a game space, for example. The personal A/V apparatus also allows communication of data, including video or other image data, game characteristics and game state, with the other computing devices and servers.

FIG. 2A is a block diagram depicting example components of one embodiment of a see-through, mixed reality display device in a system environment in which the device may operate. In this example, the personal A/V apparatus 2 includes a head-mounted portion 3 and an auxiliary processing unit 4. In other embodiments, the capabilities of the auxiliary processing unit may be integrated in software and hardware components of the head-mounted portion 3.

Here, the personal A/V apparatus 2 is in communication with processing unit 4 via a wire. In other embodiments, head-mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly to one or more of the servers, computing devices, hub computing systems 12, hot spots, cellular data networks, etc. The processing unit 4 could be a mobile computing device, for instance, which is held or worn by the user, or situated near the user.

The personal A/V apparatus 2, which in one embodiment, is in the shape of eyeglasses in a frame 115, is worn on the head of a user so that the user can see through a display, embodied in this example as a display optical system 14 for each eye, and thereby have a direct view of the physical environment in front of the user. Augmented reality images, also referred to as virtual images, can be generated by a projection system of the personal A/V apparatus and appear to be present in, or superimposed over, the physical environment.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds such as spoken commands of the user, or sounds in the physical environment of the user, and transmitting audio data to processing unit 4.

FIG. 2B is an example configuration of one embodiment of the hub computing system 12 and image capture devices 20A and 20B of FIG. 1. In one possible approach, the personal A/V apparatus 2 communicates with the game sharing server via the hub computing system 12. In another possible approach, the hub computing system 12 is not used and the personal A/V apparatus 2 communicates with the game sharing server directly via the network 8.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application executes on hub computing system 12, the personal A/V apparatus 2, or a combination of these.

One or more depth cameras, such as image capture devices 20A and 20B, can be used to capture the room or other physical environment of the user. The image capture devices can visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Hub computing system 12 may be connected to speakers 22 and an audiovisual device 16 such as a television, a monitor, a high-definition television (HDTV), or the like that may provide game or application visuals.

Figure 3A:
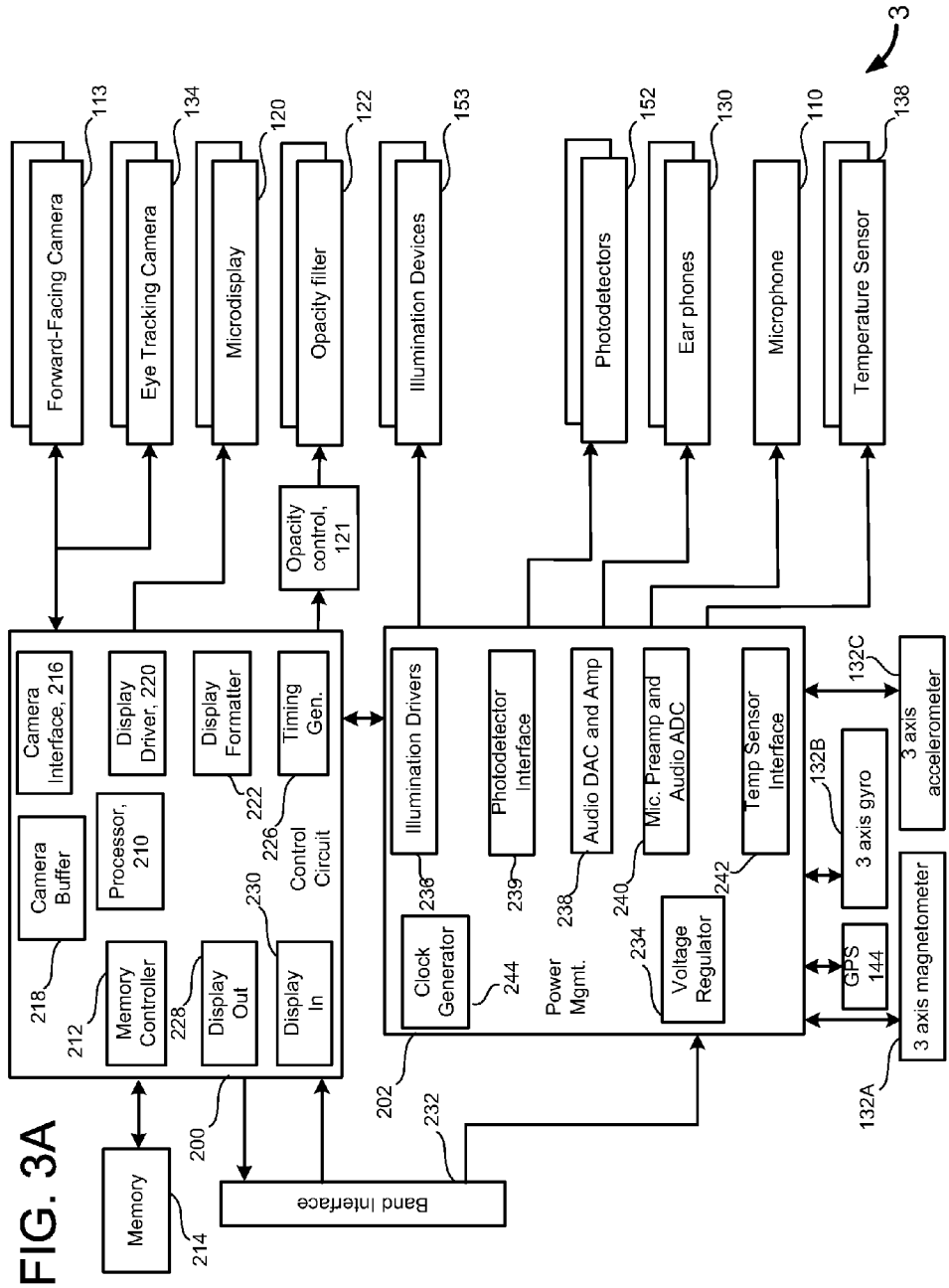
FIG. 3A is a block diagram of one embodiment of hardware and software components of the head-mounted portion 3 of the personal A/V apparatus 2 of FIG. 2A.

FIG. 3A is a block diagram of one embodiment of hardware and software components of the head-mounted portion 3 of the personal A/V apparatus 2 of FIG. 2A. In this embodiment, the head-mounted portion 3 of the personal A/V apparatus 2 receives instructions about a virtual image from processing unit 4 and provides the sensor information back to processing unit 4. Software and hardware components which may be embodied in a processing unit 4, depicted in FIG. 3B, receive the sensory information from the head-mounted portion 3 of the personal A/V apparatus 2 and may also receive sensory information from hub computing device 12 (see FIG. 2B, 4A and 4B). Based on that information, processing unit 4 will determine where and when to provide a virtual image to the user and send instructions accordingly to the control circuitry 136 of the personal A/V apparatus 2.

Note that some of the components of FIG. 3A (e.g., a forward-facing camera 113 (or a camera which otherwise faces a physical environment), eye tracking camera 134, photodetector interface 139, microdisplay 120, opacity filter 122 with opacity control 121, illumination device 153 or illuminators, earphones 130, and temperature sensor 138 are shown in shadow to indicate that there are at least two of each of those devices, at least one for the left side and at least one for the right side of personal A/V apparatus 2.

Regarding the forward-facing camera/image capture device 113, in one approach, one camera is used to obtain images using visible light. In another approach, two or more cameras with a known spacing between them are used as a depth camera to also obtain depth data for objects in a room, indicating the distance from the cameras/personal A/V apparatus to the object. The forward cameras/image capture device of the personal A/V apparatus can essentially duplicate the functionality of the depth camera provided by the computer hub 12, as described, e.g., in connection with FIG. 4B.

Images from forward facing cameras can be used to identify a physical environment of the user, including a scene which is viewed by the user, e.g., including a room in a home, e.g., walls, ceiling and floor, a ground surface outside the home, objects such as trees and structures, people and other objects in a field of view of the user, as well as gestures such as a hand gesture of the user.

The control circuit 200, in communication with the power management circuit 202, includes processor 210, memory controller 212 in communication with memory 214 (e.g., DRAM), camera interface 216, camera buffer 218, display driver 220, display formatter 222, timing generator 226, display out 228, and display in interface 230. In one embodiment, all of components of display driver 220 are in communication with each other via dedicated lines of one or more buses. In another embodiment, each of the components of control circuit 200 is in communication with processor 210.

Display formatter 222 provides information, about the image being displayed on microdisplay 120, to opacity control circuit 121, which controls opacity filter 122. Opacity filter 122 selectively blocks natural light, either uniformly or on a per-pixel basis, from passing through a light guide optical element 112. In one embodiment, the opacity filter can be a see-through LCD panel, electrochromic film, or similar device. The LCD panel can include one or more light-transmissive LCD chips which allow light to pass through the liquid crystal. Opacity filter 114 can include a dense grid of pixels, where the light transmissivity of each pixel is individually controllable between minimum and maximum transmissivities. A transmissivity can be set for each pixel by the opacity filter control circuit 121.

Camera interface 216 provides an interface to the two physical environment facing cameras 113 and each eye tracking camera 134 and stores respective images received from the cameras 113, 134 in camera buffer 218. Display driver 220 drives microdisplay 120. Display formatter 222 may provide information, about the virtual image being displayed on microdisplay 120 to one or more processors of one or more computer systems, e.g., 4, 12, 210 performing processing for the augmented reality system. Timing generator 226 is used to provide timing data for the system. Display out 228 is a buffer for providing images from physical environment facing cameras 113 and the eye tracking cameras 134 to the processing unit 4. Display in 230 is a buffer for receiving images such as a virtual image to be displayed on microdisplay 120. Display out 228 (an interface) and display in 230 communicate with band interface 232, which is an interface to processing unit 4.

Power management circuit 202 includes voltage regulator 234, eye tracking illumination driver 236, photodetector interface 239, audio DAC and amplifier 238, microphone preamplifier and audio ADC 240, temperature sensor interface 242, and clock generator 244. Voltage regulator 234 receives power from processing unit 4 via band interface 232 and provides that power to the other components of head-mounted display device 2. Illumination driver 236 controls, for example via a drive current or voltage, the illumination devices 153 to operate about a predetermined wavelength or within a wavelength range. Audio DAC and amplifier 238 receive the audio information from earphones 130. Microphone preamplifier and audio ADC 240 provide an interface for microphone 110. Temperature sensor interface 242 is an interface for temperature sensor 138. Power management circuit 202 also provides power and receives data back from three axis magnetometer 132A, three axis gyro 132B and three axis accelerometer 132C. Power management circuit 202 also provides power and receives data back from and sends data to GPS transceiver 144.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

For the personal AN apparatus 2 of FIG. 1, the communication interface 30 can comprise band interface 232, the augmented reality projection system 31 can comprise microdisplay 120, display driver 220, display formatter 222, opacity filter 122, opacity control 121, and illumination devices 153, the control circuits 32 can comprise processor 210 and memory controller 212, the one or more forward-facing cameras 33 can comprise forward-facing camera 113, camera interface 21 and camera buffer 218, the gaze detection system 34 can comprise eye tracking camera 134, and the one or more memory components 35 can comprise memory 214.

FIG. 3B is a block diagram of one embodiment of the hardware and software components of a processing unit 4 associated with a see-through, near-eye, mixed reality display unit. Control circuit 304 is in communication with power management circuit 306, and includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with the head-mounted portion 3 of the HMDD 2 via band interface 302 and band interface 232, display in buffer 338 in communication with the head-mounted portion 3 of the HMDD 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication device 346 can include a WI-FI® enabled communication device, BLUETOOTH® communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power source 376 provides power to the display device 2.

For the personal AN apparatus 2 of FIG. 1, the communication interface 30 can comprise band interface 302 and wireless communication device 346, the control circuits 32 can comprise flash controller 332, memory controller 328, CPU 320 and GPU 322 and the one or more memory components 35 can comprise flash memory 334, memory 330 and cache 324, RAM 326.

Figure 4A:
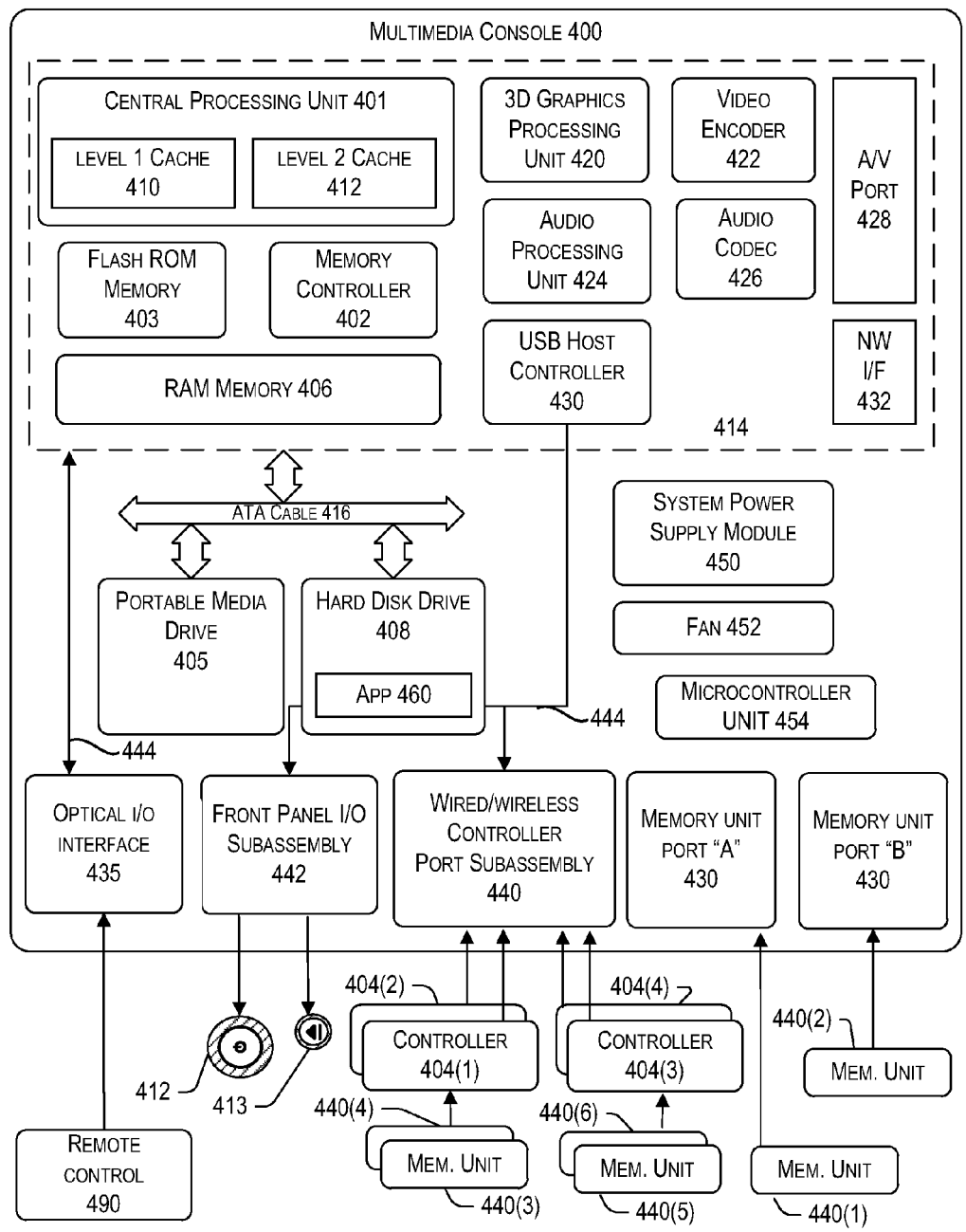
FIG. 4A is a block diagram of one embodiment of a computing system that can be used to implement the hub computing system 12 of FIG. 1.

FIG. 4A is a block diagram of one embodiment of a computing system that can be used to implement the hub computing system 12 of FIG. 1. In this embodiment, the computing system is a multimedia console 400, such as a gaming console. The multimedia console 400 has a CPU 401, and a memory controller 402 that facilitates processor access to various types of memory, including a flash Read Only Memory (ROM) 403, a Random Access Memory (RAM) 406, a hard disk drive 408, and portable media drive 405. In one implementation, CPU 401 includes a level 1 cache 410 and a level 2 cache 412, to temporarily store data and hence reduce the number of memory access cycles made to the hard drive 408, thereby improving processing speed and throughput.

CPU 401, memory controller 402, and various memory devices are interconnected via one or more buses (not shown).

In one implementation, CPU 401, memory controller 402, ROM 403, and RAM 406 are integrated onto a common module 414. In this implementation, ROM 403 is configured as a flash ROM that is connected to memory controller 402 via a PCI bus and a ROM bus (neither of which are shown). RAM 406 is configured as multiple Double Data Rate Synchronous Dynamic RAM (DDR SDRAM) modules that are independently controlled by memory controller 402 via separate buses (not shown). Hard disk drive 408 and portable media drive 405 are shown connected to the memory controller 402 via the PCI bus and an AT Attachment (ATA) bus 416.

A GPU 420 and a video encoder 422 form a video processing pipeline for high speed and high resolution graphics processing. Data are carried from GPU 420 to video encoder 422 via a digital video bus (not shown). Lightweight messages generated by the system applications (e.g., pop ups) are displayed by using a GPU 420 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 424 and an audio codec (coder/decoder) 426 form a corresponding audio processing pipeline for multi-channel audio processing of various digital audio formats. Audio data are carried between audio processing unit 424 and audio codec 426 via a communication link (not shown). The video and audio processing pipelines output data to an AN (audio/video) port 428 for transmission to a television or other display. In the illustrated implementation, video and audio processing components 420-428 are mounted on module 414.

A module 414 includes a USB host controller 430 and a network interface 432. USB host controller 430 is shown in communication with CPU 401 and memory controller 402 via a bus (e.g., PCI bus) and serves as host for peripheral controllers 404(1)-404(4). Network interface 432 provides access to a network (e.g., Internet, home network, etc.) and may be any of a wide variety of various wired or wireless interface components.

In the implementation depicted, console 400 includes a controller support subassembly 440 for supporting four controllers 404(1)-404(4). The controller support subassembly 440 includes any hardware and software components needed to support wired and wireless operation with an external control device, such as for example, a media and game controller. A front panel I/O subassembly 442 supports the multiple functionalities of power button 412, the eject button 413, as well as any LEDs (light emitting diodes) or other indicators exposed on the outer surface of console 402. Subassemblies 440 and 442 are in communication with module 414 via one or more cable assemblies 444. In other implementations, console 400 can include additional controller subassemblies. An optical I/O interface 435 sends and receives signals that can be communicated to module 414.

Memory units (MUs) 440(1) and 440(2) are connectable to MU ports "A" 430(1) and "B" 430(2) respectively. Additional MUs (e.g., MUs 440(3)-440(6)) are illustrated as being connectable to controllers 404(1) and 404(3), i.e., two MUs for each controller. Controllers 404(2) and 404(4) can also be configured to receive MUs (not shown). Each MU 440 offers additional storage on which games, game parameters, and other data may be stored. In some implementations, the other data can include any of a digital game component, an executable gaming application, an instruction set for expanding a gaming application, and a media file. When inserted into console 400 or a controller, MU 440 can be accessed by memory controller 402. A system power supply module 450 provides power to the components of gaming system 400. A fan 452 cools the circuitry within console 400. A microcontroller unit 454 is also provided.

An application 460 comprising machine instructions is stored on hard disk drive 408. When console 400 is powered on, various portions of application 460 are loaded into RAM 406, and/or caches 410 and 412, for execution on CPU 401, wherein application 460 is one such example. Various applications can be stored on hard disk drive 408 for execution on CPU 401.

Gaming and media system console 400 may be operated as a standalone system by simply connecting the system to monitor 16 (FIG. 2B), a television, a video projector, or other display device. In this standalone mode, gaming and media system console 400 enables one or more players to play games, or enjoy digital media, e.g., by watching movies, or listening to music. However, with the integration of broadband connectivity made available through network interface 432, gaming and media system 400 may further be operated as a participant in a larger network gaming community.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein by reference in their entirety.

Figure 4B:
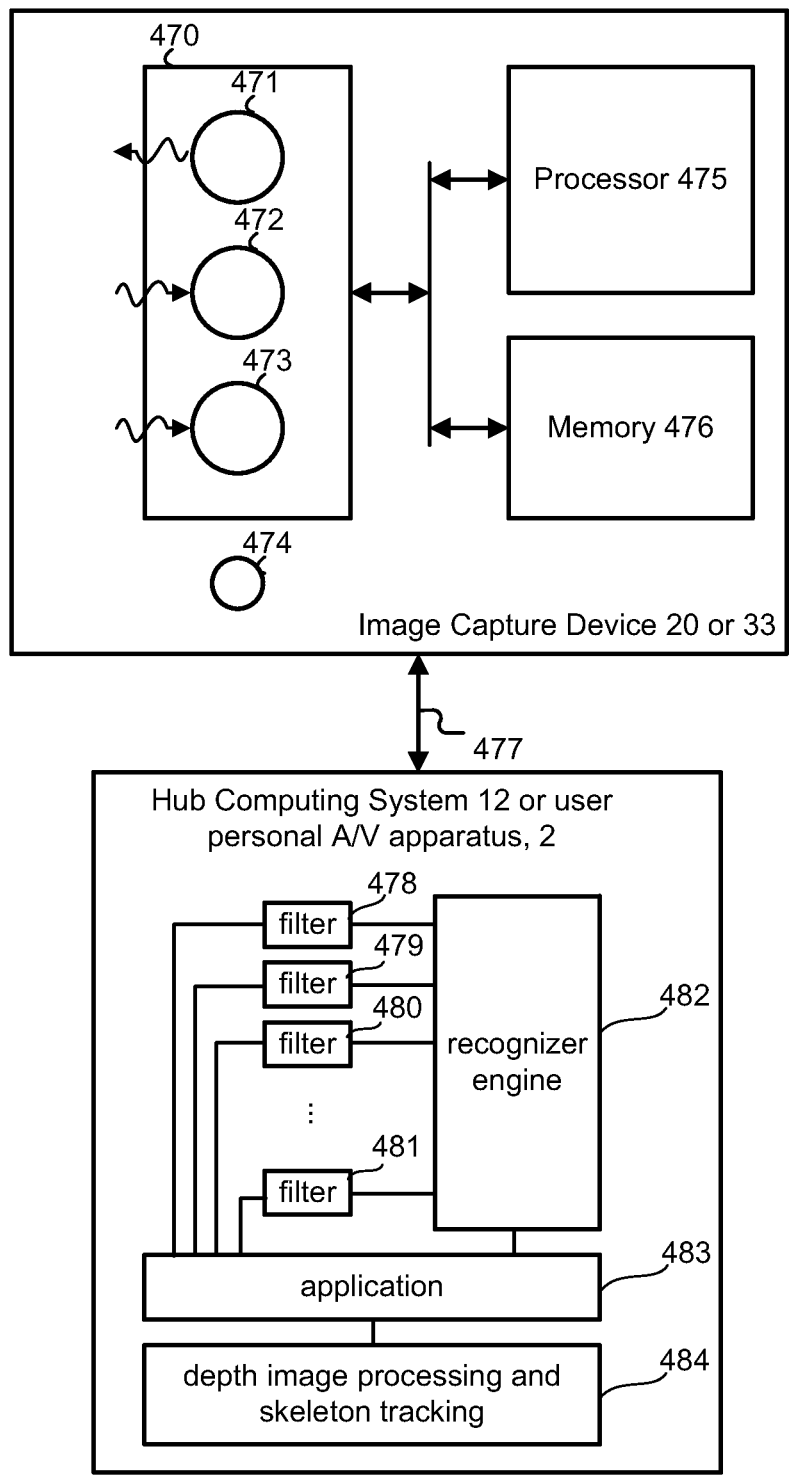
FIG. 4B is a block diagram of one embodiment of the components of the hub computing system 12 and the image capture devices 20A and 20B of FIG. 1.

FIG. 4B is a block diagram of one embodiment of the components of the hub computing system 12 or user personal A/V apparatus 2 and the image capture devices 20A, 20B or 33 of FIG. 1. The image capture devices can obtain and process images to detect a gesture such as a hand gesture, for instance, or a distance from the personal A/V apparatus to an object in a scene, or the configuration of a room or ground surface, for instance. Capture device 20 (representing 20A and/or 20B) or 33 may be configured to capture video with depth information including a depth image that may include depth values via any suitable technique including, for example, time-of-flight, structured light, stereo image, or the like. The capture device 20 or 33 may organize the depth information into "Z layers," or layers that may be perpendicular to a Z axis extending from the depth camera along its line of sight.

A camera component 470 may be or may include a depth camera that may capture a depth image of a scene. The depth image may include a two-dimensional (2-D) pixel area of the captured scene where each pixel in the 2-D pixel area may represent a depth value as a distance of an object in the captured scene from the camera.

Camera component 470 may include an infrared (IR) light emitting component 471 (which emits IR radiation as indicated by the arrow moving away from the component), an IR camera 472 (which senses IR radiation as indicated by the arrow moving toward the component), and an RGB (visual image) camera 473 (which senses visible radiation as indicated by the arrow moving toward the component) that may be used to capture the depth image of a scene. A 3-D camera is formed by the combination of the IR light emitting component 471 and the IR camera 472. In a time-of-flight analysis, the IR light emitting component 471 emits IR light onto the scene. Sensors such as the IR camera 472 and/or the RGB camera 473 are then used to detect the backscattered light from the surface of one or more targets and objects in the scene. In some embodiments, pulsed IR light may be used such that the time between an outgoing light pulse and a corresponding incoming light pulse is measured and used to determine a physical distance from the capture device 20 or 33 to a particular location on the targets or objects in the scene. Additionally, the phase of the outgoing light wave may be compared to the phase of the incoming light wave to determine a phase shift. The phase shift may then be used to determine a physical distance from the capture device to a particular location on the targets or objects.

A time-of-flight analysis may be used to indirectly determine a physical distance from the capture device 20 or 33 to a particular location on the targets or objects by analyzing the intensity of the reflected beam of light over time via various techniques including, for example, shuttered light pulse imaging.

The capture device 20 or 33 may use a structured light to capture depth information. In such an analysis, patterned light (i.e., light displayed as a known pattern such as grid pattern, a stripe pattern, or different pattern) may be projected onto the scene via, for example, the IR light emitting component 471. Upon striking the surface of one or more targets or objects in the scene, the pattern may become deformed in response. Such a deformation of the pattern may be captured by, for example, the IR camera 472 and/or the RGB camera 473 (and/or other sensor) and may then be analyzed to determine a physical distance from the capture device to a particular location on the targets or objects. In some implementations, the IR light emitting component 471 is displaced from the cameras 472 and 473 so that triangulation can be used to determined distance from cameras 472 and 473. In some implementations, the capture device 20 will include a dedicated IR sensor to sense the IR light, or a sensor with an IR filter.

The capture device 20 or 33 may include two or more physically separated cameras that may view a scene from different angles to obtain visual stereo data that may be resolved to generate depth information. Other types of depth image sensors can also be used to create a depth image. The capture device may further include a microphone 474.

A processor 475 may execute instructions for receiving a depth image, generating the appropriate data format (e.g., frame) and transmitting the data to hub computing system 12.

A memory 476 stores the instructions that are executed by processor 475, images or frames of images captured by the 3-D camera and/or RGB camera, or any other suitable information, images, or the like.

Capture device 20 is in communication with hub computing system 12 via a communication link 477 such as a wired or wireless connection. Capture device 33 is in communication with a remainder of the user personal A/V apparatus 2.

The capture device 20 provides the depth information and visual (e.g., RGB or other color) images captured by, for example, the 3-D camera 472 and/or the RGB camera 473 to hub computing system 12 via the communication link 477. Hub computing system 12 may then create and use a model, depth information, and captured images to, for example, control an application such as a game or word processor and/or animate an avatar or on-screen character. The capture device 33 can perform similar functions as the capture device 20, and the remainder of the user personal A/V apparatus can perform similar functions as the hub computing system 12.

Hub computing system 12 includes depth image processing and skeletal tracking module 484, which uses the depth images to track one or more persons detectable by the depth camera function of capture device 20. Module 484 provides the tracking information to application 483, which can be a video game, productivity application, communications application or other software application. The audio data and visual image data is also provided to application 483 and module 484. Application 483 provides the tracking information, audio data and visual image data to recognizer engine 482. In another embodiment, recognizer engine 482 receives the tracking information directly from module 484 and receives the audio data and visual image data directly from capture device 20.

Recognizer engine 482 is associated with a collection of filters 478, 479, 480, . . . , 481 each comprising information concerning a gesture, action or condition that may be performed by any person or object detectable by capture device 20. For example, the data from capture device 20 may be processed by filters 478, 479, 480, . . . , 481 to identify when a user has performed one or more gestures or other actions. Those gestures may be associated with various controls, commands, objects or conditions of application 483, such as for creating, sharing or playing a game.

As mentioned, the functions of the capture device 2 and hub computing system 12 of FIG. 4B can be provided in the personal A/V apparatus, additionally or alternatively.

One or more control circuits can be provided, e.g., by the components 4, 6, 17, 32, 38, 54, 62, 72, 401, 420, 424, 454 and 484. The one or more control circuits can include one or more processors which execute instructions stored on one or more tangible, non-transitory processor-readable storage devices for performing processor- or computer-implemented methods described herein. At least one control circuit can also include the one or more tangible, non-transitory processor-readable storage devices, or other non-volatile or volatile storage devices. The storage device, as a computer-readable media, can be provided, e.g., by components 7, 19, 35, 55, 63, 73, 214, 326, 330, 334, 403, 406, 410, 412, 440(1)-440(6) and 476.

Referring to FIGS. 5A-5C, technology can be provided for augmenting a user experience in various situations. In one embodiment, an information provider prepares supplemental information regarding actions and objects occurring within an event. A user wearing an at least partially see-through, head mounted display can register (passively or actively) their presence at an event or location and a desire to receive information about the event or location. FIG. 5A illustrates a block diagram of a system for implementing the augmenting of the user experience. For example, FIG. 5A shows a personal A/V apparatus 502 in communication with a Supplemental Information Provider 504 via one or more networks 506. In one possible approach, the Supplemental Information Provider 504 is the game sharing server 50 of FIG. 1.

In one embodiment, the personal A/V apparatus 502 can be the personal A/V apparatus 2 in communication with a local processing apparatus (e.g., processing unit 4 of FIG. 2A, a mobile device, or other suitable data processing device). One or more networks 506 can include wired and/or wireless networks, such as a LAN, WAN, WI-FI®, the Internet, an Intranet, cellular network etc. No specific type of network or communication means is required. In one embodiment, Supplemental Information Provider 504 is implemented in hub computing system 12 (See FIG. 1). However, Supplemental Information Provider 504 can also be implemented in other types of computing devices (e.g., desktop computers, laptop computers, servers, mobile computing devices, tablet computers, mobile telephones, etc.). Supplemental Information Provider 504 can be implemented as one computing device or multiple computing devices. In one embodiment, Supplemental Information Provider 504 is located locally to personal A/V apparatus 502 so that they communication over a local area network, WI-FI®, BLUETOOTH® or other short range communication means. In another embodiment, Supplemental Information Provider 504 is located remotely from personal A/V apparatus 502 so that they communication over the Internet, cellular network or other longer range communication means.

FIG. 5B shows an example architecture for one or more processes and/or software running on Supplemental Information Provider 504. Supplemental Information Provider 504 may create and provide supplemental event or location data, or may provide services which transmit event or location data from third party event data providers 518 to a user's personal A/V apparatus 502. Multiple supplemental information providers and third party event data providers may be utilized with the present technology. A supplemental information provider 504 will include data storage for supplemental live event information 510, user location and tracking module 512, information display applications 514, and an authorization component 516.

Supplemental Information Provider 504 includes the supplemental event data for one or more events or locations for which the service is utilized. Event and/or location data can include supplemental event and location data 510 about one or more events known to occur within specific periods and/or about one or more locations that provide a customized experience. User location and tracking module 512 keeps track of various users which are utilizing the system. Users can be identified by unique user identifiers, location and other elements. An information display application 514 allows customization of both the type of display information to be provided to users and the manner in which it is displayed. The information display application 514 can be utilized in conjunction with an information display application on the personal A/V apparatus 502. In one embodiment, the display processing occurs at the Supplemental Information Provider 504. In alternative embodiments, information is provided to personal A/V apparatus 502 so that personal A/V apparatus 502 determines which information should be displayed and where, within the display, the information should be located. Third party supplemental information providers 504 can provide various types of data for various types of events, as discussed herein.

Various types of information display applications can be utilized in accordance with the present technology. Different applications can be provided for different events and locations. Different providers may provide different applications for the same live event. Applications may be segregated based on the amount of information provided, the amount of interaction allowed or other feature. Applications can provide different types of experiences within the event or location, and different applications can compete for the ability to provide information to users during the same event or at the same location. Application processing can be split between the application on the supplemental information providers 504 and on the personal A/V apparatus 502.

FIG. 5C shows another configuration/embodiment in which Supplemental Information Provider 504 is located locally to personal A/V apparatus 502, and Supplemental Information Provider 504 is in communication with Central Control and Information Server(s) 522 via one or more networks 520. In one possible approach, the Central Control and Information Server(s) are provided by the game sharing server 50 of FIG. 1. In one embodiment, one or more networks 520 can include wired and/or wireless networks, such as a LAN, WAN, WI-FI®, the Internet, an Intranet, cellular network etc. No specific type of network is required. Central Control and Information Server(s) 522 is/are located remotely from Supplemental Information Provider 504.

In one embodiment, Central Control and Information Server(s) 522 provide central control and data storage for multiple Supplemental Information Providers 504, 504a, 504b, . . . which are in communication with respective personal A/V apparatus 502, 502a, 502b, . . . Each of the Supplemental Information Providers 504, 504a, 504b, . . . are at different locations and able to connect to any personal A/V apparatus that is within a geographic region of the respective Supplemental Information Provider.

Sharing Games Using Personal A/V Apparatus

The personal A/V system can be used to help users create and organize new games. For example, the personal A/V system can help distribute rules and indications of boundaries, record game state, and push out new rules. This push would be to other users also wearing the system. Or if one user had a system and was on an instrumented court, the user might be able to use a depth sensor or other sensors so that not everyone would need an HMDD. In another aspect, a server can push a new game to users on demand. A new game can be uploaded and shared games from users of a game sharing system or service. In one approach, these users are registered users.

One embodiment includes a method for presenting a game, comprising: creating rules for a game; identifying boundaries for the game; identifying players for the game; transmitting the rules and boundaries to the players; playing the game; monitoring the boundaries using multiple personal see through A/V devices that each include multiple sensors; and managing/saving game state.

Figure 6A:
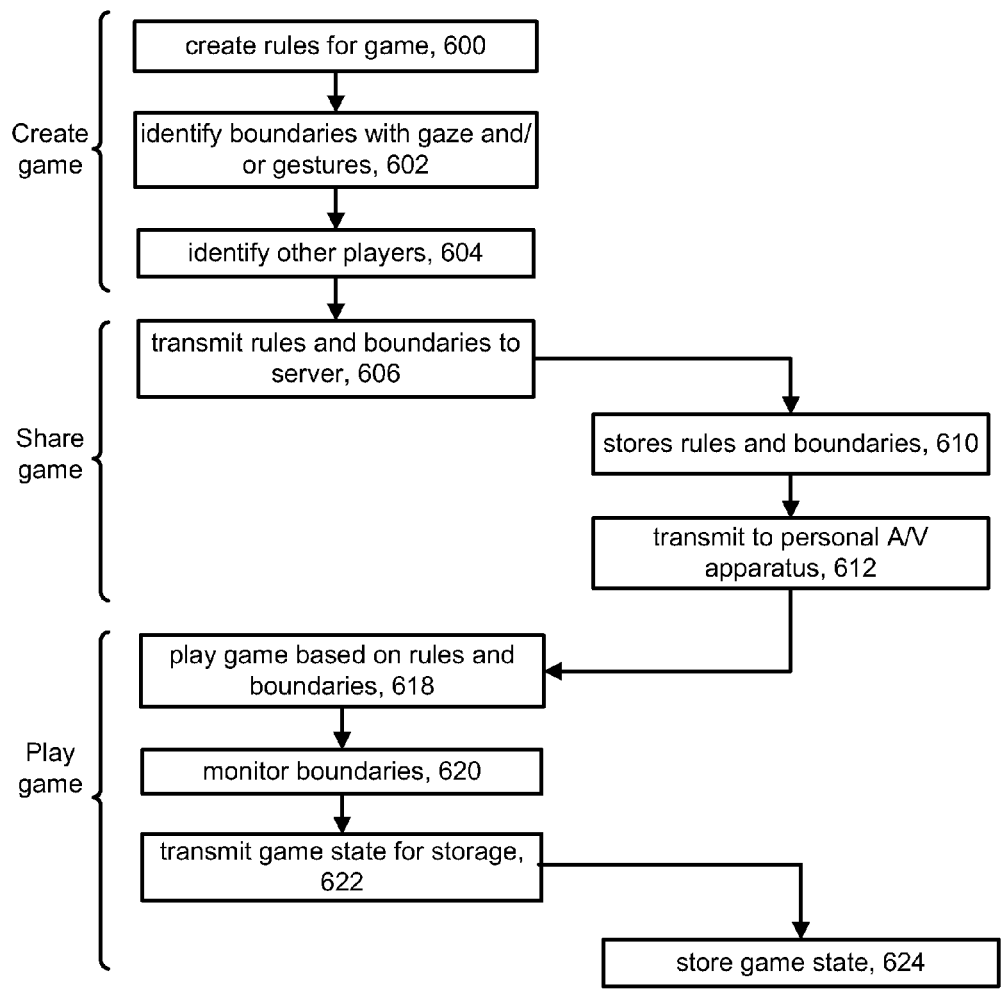
FIG. 6A is a flowchart describing one embodiment of a process for presenting a game using one or more personal A/V devices.

FIG. 6A is a flowchart describing one embodiment of a process for presenting a game using one or more personal A/V devices. The process of FIG. 6A can be performed by using any of the embodiments of FIGS. 5A-5C, for instance.

Note that in the flowchart of FIG. 6A, the steps on the left side of the flowchart are performed by the personal A/V apparatus 502 and the steps on the right side of the flowchart performed by Supplemental Information Provider 504 and/or Central Control and Information Server 522.

Figure 6B:
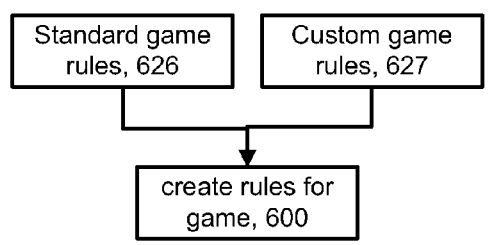
FIG. 6B is a flowchart describing example details for creating rules for a game, in connection with step 600 of FIG. 6A.

In step 600, one or more persons will create rules for the game using their personal A/V apparatus and/or other computing device (see also FIG. 6B). The process can be performed by launching an application at the personal A/V apparatus. The user can type rules using a keyboard or virtual keyboard, say the rules which will be recorded in an audio file, say the rules which are then converted to text for a text file or use other input apparatus to create a set of rules for a game. In step 602, the user will indicate boundaries for the game. The boundaries can be identified by monitoring the user's gaze or the user using gestures (see also FIG. 6C). By monitoring the gaze, the user can look at a location which is the end point or boundary and say "boundary." In step 604, the user can identify other players by saying their names, typing their names, or otherwise selecting the names from a list of friends/family, acquaintances, etc. (see also FIG. 6G). The rules and boundaries identified above are transmitted to a server in step 606.

Step 606 includes a personal A/V apparatus 502 transmitting the rules and boundaries to a Supplemental Information Provider 504 (which then may relay the information to Central Control and Information Server 522). Thus, a server receives, from a computing device of a first user, an upload of code representing a definition of a game, where the definition comprises rules and boundaries of the game and user permissions. In step 610, the server will store the rules and boundaries (see also FIG. 6H). Thus, the server stores the code representing the definition. In step 612, the rules and boundaries are transmitted to the personal A/V apparatuses for those other players identified in step 604 (see also FIG. 6I-6K). In one approach, the server accesses the user permissions to determine whether a head-mounted display device of a second user is allowed to access the rules and boundaries of the game. If the accessing the user permissions determines that the head-mounted display device of the second user is allowed to access the rules and boundaries of the game, the server accesses the code to provide a download of the rules and boundaries of the game to the head-mounted display device of the second user. In step 618, after receiving their rules and boundaries, the various players can (optionally) play the game based on the rules and boundaries transmitted to them (see also FIG. 6L).

While playing the game, each player's personal A/V apparatus 502 will monitor the player's three dimensional location and the boundaries (step 620, see also FIG. 6M). If the player comes close to a boundary, the personal A/V apparatus will automatically highlight the boundary by changing its color, pointing to it with an arrow (or other shape), drawing a red line next to it, etc. If the user crosses over the boundary, the personal A/V apparatus 502 will identify the infraction to the player and transmit that infraction to the server (Supplemental Information Provider 504 and/or Central Control and Information Server 522). In step 622, each personal A/V apparatus 502 will transmit game state for storage to the Supplemental Information Provider 504. In one embodiment, step 622 is performed continuously or periodically. The game information is stored in step 624 by the Supplemental Information Provider 504 and/or Central Control and Information Server 522 for future access. See also the example game state data of FIG. 6N.

In some embodiments, holographic/virtual objects can be specified for use in the game. For example, if there's a virtual jousting game, virtual shields and lances would be required, in addition to the lines designating the area where a player should run. See also FIG. 14A and 14B.

FIG. 6B is a flowchart describing example details for creating rules for a game, in connection with step 600 of FIG. 6A. In one approach, standard game rules 626 or custom game rules 627 can be used (step 600). As mentioned previously, standard rules can be adopted by a user for a game regarding, e.g., the number of players, the roles of the players, how points or scored or penalties are assessed, how long a game lasts, and so forth. For instance, for a baseball game, standard rules indicate there are three outs per inning and nine innings per game. A user could modify the standard rules to create custom rules, such as by deciding to have two outs per inning instead of three. This can be achieved using the personal A/V apparatus 2 or other computing device 13, for instance, by entering appropriate commands by gestures, voice, or by an input device such as a mouse or touchscreen. Another example of entering commands is displaying a virtual keyboard to the user as an augmented reality image, and sensing the user's fingers typing on the keyboard as control inputs. In some cases, menus of available commands can be provided, and a particular command selected from the menu.

In one approach, a user interface or menu is presented which asks the user to confirm or modify the standard rules of a game, or to add additional rules. In another approach, a user can provide commands which set custom rules. A custom rule could indicate, for example, that a user has to run around the bases in a reverse direction than is standard. As another example, a rule of a football game can require a user to catch the ball with only one hand. Users can define their own games using their imaginations.

In addition to the rules, a configuration of a game space can be standardized or custom. A standardized game space can be provided by a template which provides a model of boundary lines and features of a game space. For example, templates may be provided for various common games, e.g., sports such as baseball, volleyball or basketball, or children's games such as kick the can, capture the flag, or hide and seek. A template can provide the boundary lines and features which are standard for those games. For example, a template of a baseball game could have foul lines, lines which denote the infield, outfield and the fence, as well as features or objects such as bases and the pitcher's mound. See also FIG. 9A. A template for the game of kick the can may have a rectangular field with a central zone in which a can is placed. See also FIG. 8A.

A user could also modify a standard game template to personalize it. For example, a user could decide to have three bases instead of four in a baseball field. In this case, the user can enter commands to modify the template to remove a base. A user could also modify a game template by changing it relative proportions. For instance, a game field can be made longer or wider than is standard.

Once a standard template has been accepted or modified, the user can position the model provided by the template at a desired location in a physical environment, using a personal A/V apparatus or other computing device. In one approach, one or more points in a physical environment are defined and the model is positioned with respect to them. See FIGS. 9C and 9D, for example. Users playing the game will see the boundary lines and features as augmented reality images which are generated by their personal A/V apparatus based on their own perspective of the game. Users may also see another user with a virtual object such as a bat.

In another approach, one or more points in a physical environment are defined as points on boundary lines of the game space. Points of a game space can be defined in different ways. In one approach, a gaze direction of the user is used to determine a gazed-upon point in a physical environment. Boundary lines can be created by defining and joining multiple points. A boundary line can be straight or curved. A point by itself could also be a location of interest and not necessarily part of a boundary line. A user could also move to different locations in an area to define points in the game space, relying on a location detection capability of the personal A/V apparatus.

In another approach, a user obtains an image of an instrumented court, and uses it to provide a model for the game space. For example, a camera-captured image of a volleyball court can be taken and processed to identify the boundary lines, which are painted lines on a floor, for instance. An instrumented court could be any area that is already premeasured or predefined, such as a regulation size basketball court, volleyball court, baseball field and so forth. A game space can be created which matches the instrumented court. See FIGS. 6D, 9A and 9B, for example. Further details regarding defining points in a game space are discussed next.

FIG. 6C is a flowchart describing example details for defining boundaries of a game space, in connection with step 602 of FIG. 6A. In one approach, a gaze detection capability of the personal A/V apparatus is used to define a point in a physical environment. An example implementation includes detecting a gaze direction of the user at step 630. See FIG. 7 for further details. For example, the user may be at a location in which the game space is to be located. The user can gaze at an area of the physical environment, such as an object, or an area on the ground, wall or ceiling, for instance. Example gaze directions are represented by lines or vectors 801-803 in the scenario of FIG. 8A. Step 631 includes detecting the physical environment, e.g., using the image capture device 33 to obtain a depth image of the physical environment. For example, in the scenario of FIG. 8A, the depth image can identify the ground 818 as a horizontal surface and any objects/structures such as the tree 804 and the can 816. Step 632 includes detecting an intersection of the gaze direction and the physical environment. For example, in FIG. 8A, point 817 is an intersection between the gaze direction 801 and the tree 804, point 812 is an intersection between the gaze direction 803 and the ground 818, and point 813 is an intersection between the gaze direction 802 and the ground 818. An intersection can be determined by projecting the gaze direction as a vector in a 3D space of the depth map and detecting where the vector intersects with a depth surface. This results in a point in the game space, at step 633.

Figure 8A:
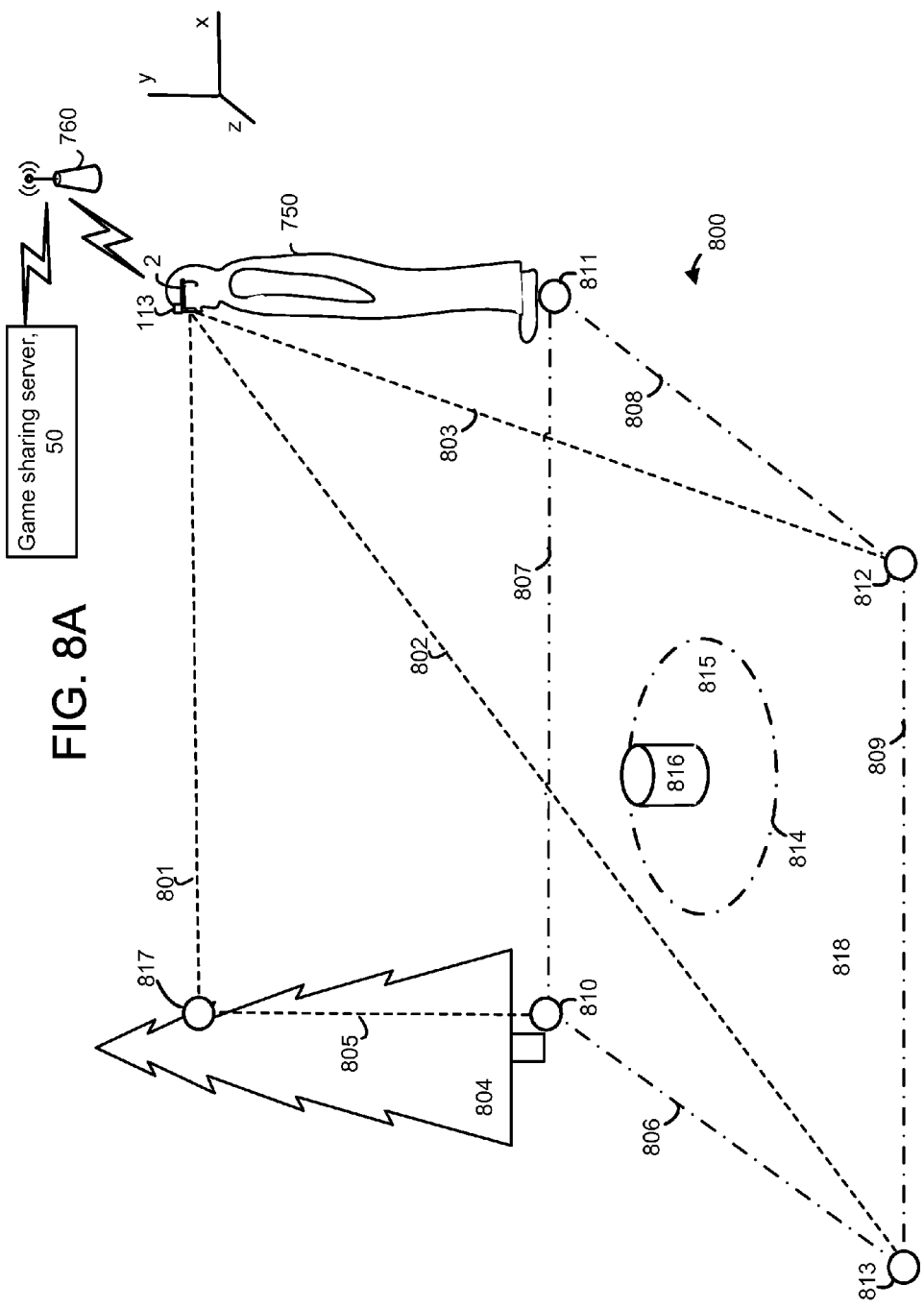
FIG. 8A depicts an example scenario in which boundaries of a game space 800 are defined.

In another approach, at step 628, a user moves to a location at which a point is to be defined. For example, the user 750 in FIG. 8A is at a location of a point 811. A location detection system of the personal A/V apparatus detects the user's current location. At step 639, the user enters a command to set a point at the location, e.g., based on a spoken command such as "Set point at current location," or based on an equivalent hand gesture. As a result, the point is defined and registered as a point in the game space at step 633.

Depending on the location system used, the point can be represented, e.g., by a longitude and latitude, or by longitude, latitude and altitude or height above ground.

In one approach, a point which is above a ground surface can be translated to the ground surface. For example, point

817 in FIG. 8A can be translated to point 810. This can result in points (and boundary lines defined by connecting the points) which conform to the ground surface, in one approach.

Once a point is defined, the personal A/V apparatus can display the point to the user as an augmented reality image, at step 634. In one approach, the currently-defined point is displayed and updated in real time as the user move around or changed their gaze direction. This serves as a feedback to the user of where the point will be defined. The user can make adjustments to ensure the point is at the desired location and enter a command such as "accept point" to accept the point. Decision step 635 determines if there are additional points to define. If there are additional points to define, the processes starting at step 630 or 638 can be repeated. If there are no additional points to define, one of two branches can be followed. In one branch, step 636 connects the points to define the one or more boundaries such as boundary lines of the game space. This can occur automatically as each point is defined, or based on a user command such as "connect points." At step 637, the personal A/V apparatus displays the boundaries of the game space. In another branch, step 640 selects a model, such as a model of a selected game, e.g., baseball, volleyball, or kick the can. See, e.g., FIG. 6D for further details. Step 641 fits the model to one or more points. For example, see FIG. 9B, which depicts a model 910 of a baseball field which is fitted to a location of the user in FIG. 9C based on the points 810 and 811, and FIG. 9D, which depicts the resulting game space (image 950). The fitting can involve defining a positioning and/or changing dimensions of the game space. For example, a game space can be defined with respect to, or anchored to, one or more points. Two points can define a line with which a boundary line of the game space is aligned. For instance, the two points 810 and 811 define the first base foul line of a baseball game.

If the distance between points 810 and 811 is less than the length of a standard baseball field, the model of the baseball field (e.g., the game space) is scaled down so that the length of the foul line is the distance between points 810 and 811. Other dimensions of the model of the baseball field, e.g., the distance from home plate to first base or third base, are scaled down proportionately. If the distance between points 810 and 811 is more than the length of a standard baseball field, the model of the baseball field is scaled up so that the length of the foul line is the distance between points 810 and 811, and other dimensions of the model of the baseball field are scaled up proportionately.

Step 637 can cover a case where the personal A/V apparatuses of multiple users see the same points and/or boundaries which are being defined in the game space. For example, a first user may define a point which a second user sees. The second user may suggest that the defined point is not in a proper location and request that the first user re-define the point. Or, the second user may define the point, so that multiple users define the points of a game space in a collaborative manner. In this scenario, augmented reality images are shared in real-time among the personal A/V apparatuses, e.g., by direct communications between the apparatuses or by communications between the apparatuses via a server.

Figure 6F:
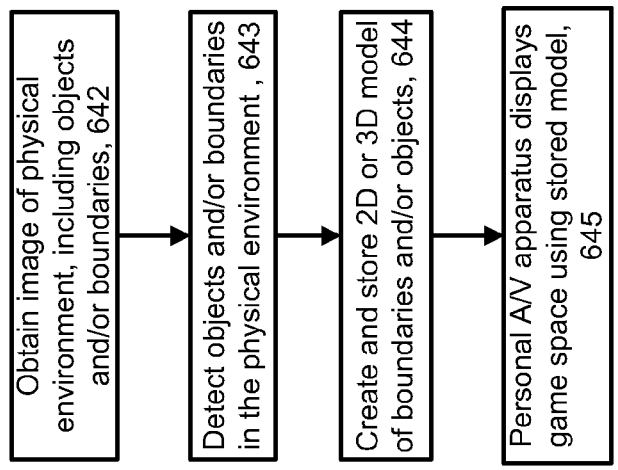
FIG. 6F is a flowchart describing example details for providing a virtual object in a game space, while creating a game.
Figure 6E:
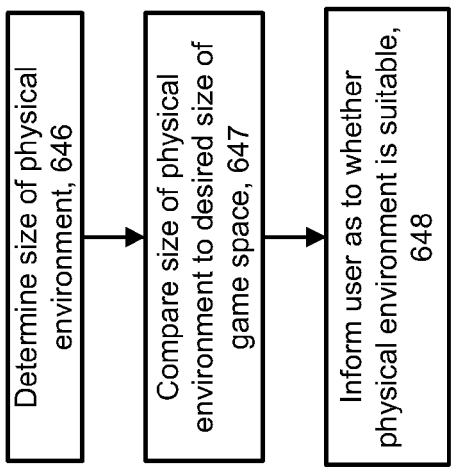
FIG. 6E is a flowchart of a method for determining whether a physical environment is suitable for a game space.
Figure 6D:
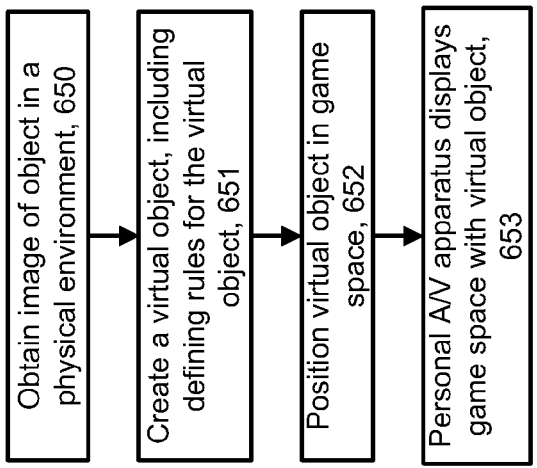
FIG. 6D is a flowchart describing example details for creating a game space, as an alternative or addition to FIG. 6C.

FIG. 6D is a flowchart describing example details for creating a game space, as an alternative or addition to FIG. 6C. Step 642 comprises obtaining an image of a physical environment, including objects and/or boundaries. Generally, the sensors of a personal A/V apparatus can be used to scan a physical game space to obtain one or more images to define a virtual game space. This scan can include an exact scan of the physical environment and then using that as game space. This can provide the user with the illusion that the user is playing a virtual game within a physical room, for instance. For example, the user can scan in their living room and use it as a game space. Objects in the living room such as a lamp on a table can also be scanned in and provided in the game space. The scan could include the floors, walls, ceiling, and furniture, including the colors and textures of these surfaces and objects. A game can then be created which models the living room and the objects in it. The user can then play a game involving a real or virtual remote control helicopter which the user controls to fly around in a virtual game space which models the living room. The user can play this game anywhere. Moreover, the game space can react to the position of the helicopter. For instance, a model of the lamp in the game space can react to the helicopter flying into it by generating a virtual collision, e.g., in which the model of the lamp falls over and breaks. If the helicopter is virtual, it can react to the collision by careening off of the lamp. This is an example of a virtual/physical game space scenario.

The scan of the physical environment can be from the personal A/V apparatus or other device of one or more users. For example, a virtual game space may be generated by multiple sensors from different users having different perspectives of the physical environment. The scan may be obtained at the beginning of a game. Optionally, additional scans can be made to add a new space and/or object to an existing game space, or to increase the accuracy with which the physical environment is captured. For example, a depth measurement of an object in a physical environment can be made more accurate when the object is seen from different perspectives. Game space scans may be saved and recalled for future play sessions.

In some cases, the physical environment is an instrumented game space such as an instrumented court. A user can obtain an image of the instrumented court, and use this to provide a model for the game space. For example, a camera-captured image of a baseball field can be taken and processed to identify the boundary lines which are painted lines on a floor, for instance. An instrumented court could be any area that is already premeasured or predefined, such as a regulation size basketball court, volleyball court, baseball field and so forth.

Figure 9A:
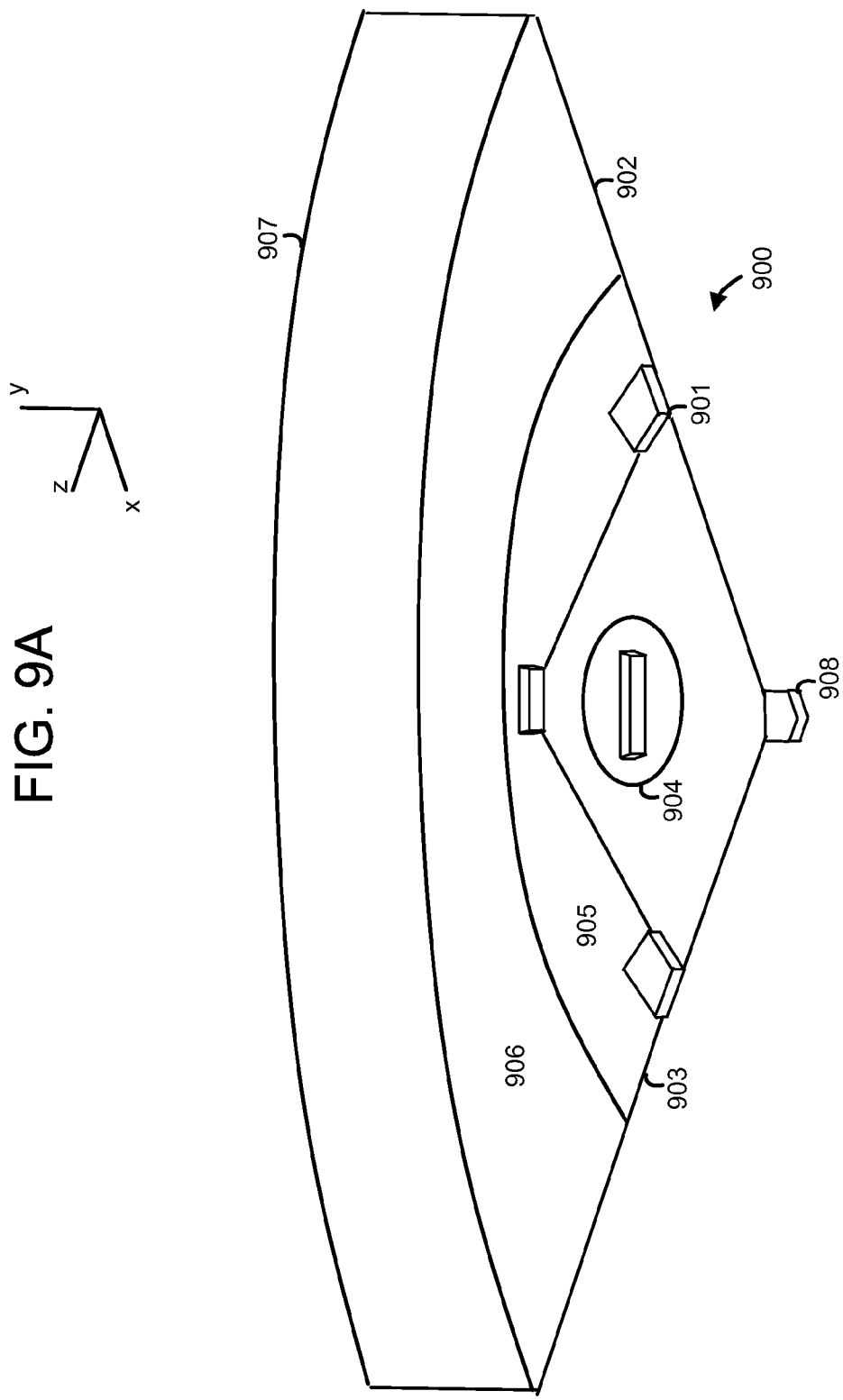
FIG. 9A depicts an image of an instrumented game space in a physical environment, in connection with step 645 of FIG. 6D.

For an instrumented game space, step 642 includes obtaining an image of boundaries and/or objects in an instrumented game space in a physical environment. For example, the user can move to a position which has a good view of the instrumented game space and enter a command such as "capture image." The personal A/V apparatus can display the current view of the instrumented game space in real time, and the user can make an adjustment such as by changing the head orientation or moving further, closer, or to obtain a different perspective. The user can enter a command such as "capture image" to capture the current image. FIG. 9A provides an example of a captured image. In some cases, it is better if the user is elevated above the instrumented game space.

Step 643 detects the objects and/or boundaries in the physical environment. In one approach, boundary lines are detected from the image, such as painted lines on a floor of a volleyball or basketball court, or chalk lines on a baseball field. For example, one may use a line detection technique such as discussed in US2009/0128667, to Gloudemans et al., titled "Line Removal And Object Detection In An Image," published May 21, 2009, and incorporated herein by reference.

Step 644 creates and stores a 2D or 3D model of the boundaries and/or objects. See FIG. 9B, which is a model 910 derived from the image of FIG. 9A. The positions of the lines in 2D or 3D space can be converted to a model which can be represented as an augmented reality image. The model provides a game space in a virtual environment which matches the instrumented game space in the physical environment. See FIGS. 6D, 9A and 9B, for example.

At step 645, the personal A/V apparatus displays the game space using the stored model. The user can confirm that the game space is accurate and, if necessary, capture another image which can provide a model which better matches the instrumented game space. The model can also be fitted/scaled to provide a virtual game space based on one or more points as mentioned in connection with step 641 of FIG. 6C.

FIG. 6E is a flowchart of a method for determining whether a physical environment is suitable for a game space. In one approach, the sensors of the personal A/V apparatus are used to determine whether a physical environment, such as a room, other closed environment, e.g., office conference room or warehouse, or an open environment, is suitable for a game space. For example, a game space may be best experienced when a game space is within minimum and maximum bounds. A user may not know whether a game space fits in a given physical environment. The sensors can include the image capture devices which obtain a depth image of an environment and calculate dimensions and/or a size of the environment. For example, the physical environment of the user can be a scene which is viewed by the user, e.g., a room in a home, including walls, ceiling and floor, a ground surface outside the home, and objects such as trees and structures.

Specifically, step 646 determines a size of a physical environment. For example, in FIG. 13, a user 750 faces a room 1300, and a forward-facing camera 113 of an image capture device obtains a depth image of the room. Lines 1301 and 1302 represent boundaries of a field of view of the camera. The depth camera indicates that the room has a length L1 and a width W1. Step 647 compares the size of the physical environment to a desired size of a game space. For example, the dimensions L1 and W1 are compared to L2 and W2 to determine that L1>L2 and W1>W2 Therefore, the room size is sufficient to accommodate the game space 861. Step 648 informs the user as to whether the physical environment is suitable for the game space. For example, an augmented reality image may be displayed which shows the game space in the room and in an indication that the "room size is ok." Or, if the physical environment is not suitable, an augmented reality image may be displayed which states: "room size is too small," or "room size too big." The user can also be informed of the desired dimensions of the game space, e.g., L2 and W2, a range of the desired dimensions and/or a range of desired dimensions for the room or other physical environment.

Note that the game space is not necessarily rectangular and uniform, but may have any configuration.

FIG. 6F is a flowchart describing example details for providing a virtual object in a game space, while creating a game. In some case, it is desirable to allow the user to add a virtual object in the game space. The object may be part of the game. For example, a user may desire to replace the baseball in a baseball game with some other object. A user may desire to replace the can in the game of kick the can with a lamp, as shown in FIG. 10D (compare to FIG. 8A). To do this, in one approach, at step 650, the user obtains an image of an object in a physical environment, e.g., a real-world object. For example, the forward-facing camera 113 of the personal A/V apparatus can be used. A single image from one side of the object can be captured, or images from different sides of the object can be captured such as by repeatedly re-positioning the object and capturing images of it and/or by walking around the object while capturing/scanning images of it. FIG. 10B provides an example of an image 1011 of a lamp 1002. Step 651 creates a virtual object, including, optionally, defining rules for the virtual object. FIG. 10C provides an example of a virtual object 1016 based on the lamp 1002. A virtual object can be created from the one or more images which are obtained of the corresponding real-world object. For example, techniques may be used as discussed in U.S. Pat. No. 6,084,979 to Kanade et al., titled "Method for creating virtual reality," issued Jul. 4, 2000, incorporated herein by reference.

At step 652, the user positions the virtual object in the game space. For example, the lamp 1002 can be positioned in the zone 814 of the game space 1050 of FIG. 10D. The commands for positioning can be entered by the user via the personal A/V apparatus or other computing device. At step 653, the personal A/V apparatus displays the game space with the virtual object, such as the game space 1050 of FIG. 10D.

Figures 6G, 6H:
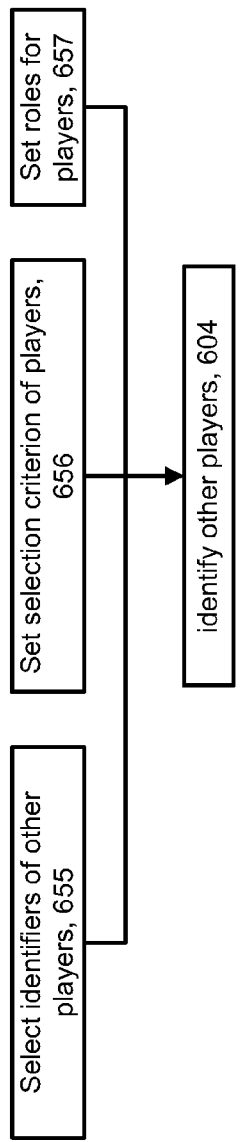
FIG. 6G is a flowchart describing example details for identifying players of a game, in connection with step 604 of FIG. 6A.
FIG. 6H provides example database records for storing game definitions, such as rules, boundaries and user permissions, in connection with step 610 of FIG. 6A.

FIG. 6G is a flowchart describing example details for identifying players of a game, in connection with step 604 of FIG. 6A. At step 655, the user selects identifiers of other players, e.g., friends of the user, users on a list of contacts, a group of users, and so forth. In this case, the user may share the game with specific other people who are known. The user can grant permission to the specific other people to share the game. At step 656, the user sets selection criterion of players who may or may not be known. For example, a user can decide that players who are near a certain location are eligible to play the game. Or, players with a certain skill level, or players who subscribe to a gaming service and pay to participate, are eligible to play the game. The user can grant permission to the people who meet the criterion to share the game. At step 657, the user sets roles for the players. For example, in a baseball game, specified users can be assigned to positions in the field, e.g., Jim will play first base and Sue will play second base. At step 604, the other players are identified.

FIG. 6H provides example database records for storing game definitions, such as rules, boundaries and user permissions, in connection with step 610 of FIG. 6A. The game definitions can be stored by the game sharing server, for instance. A definition can provide relevant information for one or more games. Here, three games are defined: Game1, Game2 and Game3. For Game1, an owner of the game is user1. Permission to share the game is granted to user2 and user3, two specific known people. Characteristics of the game can include rules, boundaries, location, objects such as virtual objects, a desired/maximum number of players, a player/game space size ratio and a model of a game space (see, e.g., FIG. 6D). This ratio can allow a game space to be automatically sized based on the current number of players, as discussed further in connection with FIG. 6K. For Game2, the owner is user4, permission is granted to any user in a certain location referred to as location A, and one or more characteristics (not specified) are provided. For Game3, there is no owner, the permissions indicate that any user can play, e.g., the game is unrestricted, and one or more characteristics (not specified) are provided.

The server can use this information to facilitate sharing of a game among users.

Figure 6K:
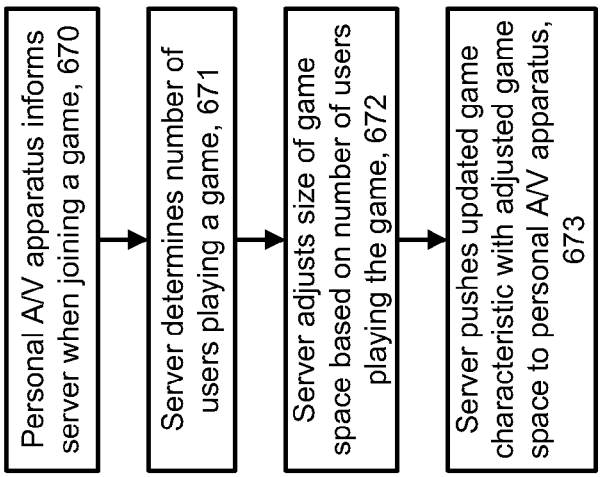
FIG. 6K is a flowchart describing example details for transmitting game characteristics to a personal AN apparatus, in connection with step 612 of FIG. 6A, where the server adjusts the size of a game space based on the number of players.
Figure 6J:
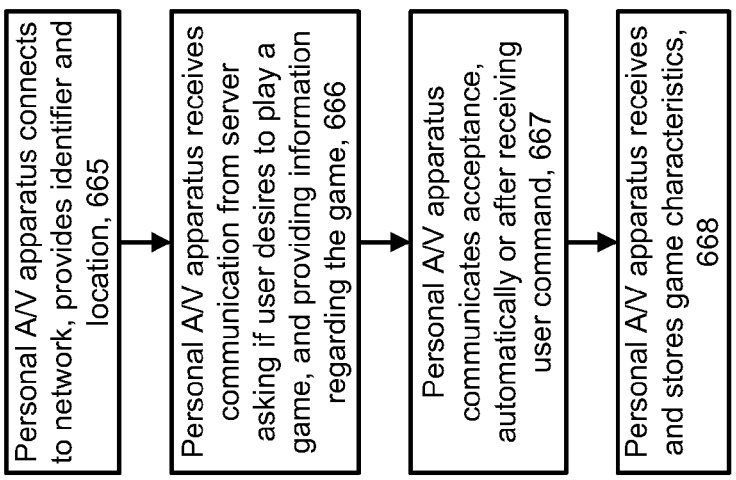
FIG. 6J is a flowchart describing example details for receiving game characteristics at a personal A/V apparatus, in connection with step 612 of FIG. 6A.
Figure 6I:
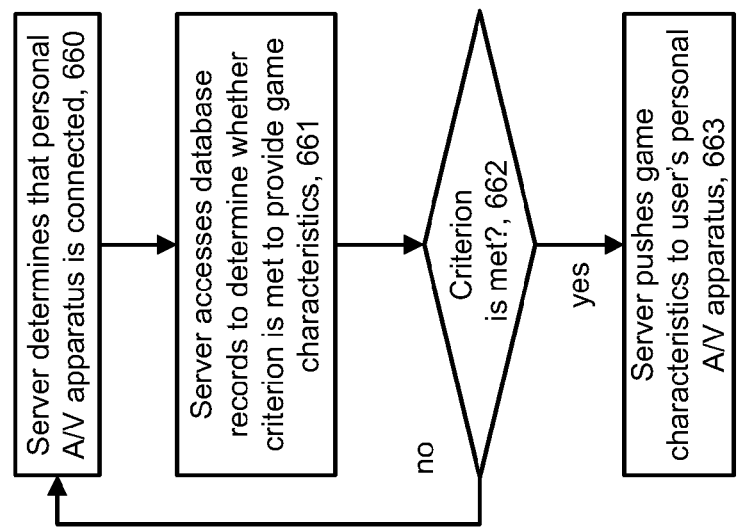
FIG. 6I is a flowchart describing example details for transmitting game characteristics to a personal A/V apparatus, in connection with step 612 of FIG. 6A, from a perspective of a server.

FIG. 6I is a flowchart describing example details for transmitting game characteristics to a personal A/V apparatus, in connection with step 612 of FIG. 6A, from a perspective of a server. In this approach, the server determines that a personal A/V apparatus is connected to a network at step 660. For example, the personal A/V apparatus may announce its presence when connecting, or periodically while connected. At step 661, the server accesses database records (such as the game definition of FIG. 6H) to determine whether one or more criterion are met to provide game characteristics to the personal A/V apparatus. For example, the criterion can be met based on whether a user of the personal A/V apparatus has permission to access the game, and/or whether the personal A/V apparatus is in a location of the game. Decision step 662 determines whether the criterion is met. For example, the server may receive a user identifier and location data of the personal A/V apparatus, and compare this to the database record of FIG. 6H. If decision step 662 is false, the process of steps 660-662 is repeated. If decision step 662 is true, the server pushes the game characteristics to one or more user's personal A/V apparatuses, at step 663.

A server push technology generally allows data to be transmitted to a client device such as a personal A/V apparatus without a specific request by the user of the personal A/V apparatus. The data is transmitted at the request of the server instead of the client device. Push technology is contrasted with pull technology, in which a request for data from a server is initiated by the client device. In some cases of push technology, the server becomes aware of the presence of the client device by a program running at the client device and sending information to the server. The server processes the information (e.g., user identifier and location) to determine that game characteristics should be transmitted to the client device. This approach is useful because it does not require the user of the personal A/V apparatus to take a specific action to learn that a game is available to be shared. For example, a user may be walking in a location associated with a game space, in which case the user can automatically receive a game which is pushed out by the server and begin playing the game.

FIG. 6J is a flowchart describing example details for receiving game characteristics at a personal A/V apparatus, in connection with step 612 of FIG. 6A. At step 665, the personal A/V apparatus connects to a network and provides a user identifier and location to a server, for instance. At step 666, the personal A/V apparatus receives a communication from the server asking if user desires to play a game, and providing information (e.g., characteristics) regarding the game. At step 667, the personal A/V apparatus communicates an acceptance, automatically, or after receiving a user command. Regarding an automatic acceptance, a user may configure a profile which indicates that the user is willing to automatically accept game characteristics. This willingness can be conditional, based on factors such as the game owner, the location, time of day, and so forth. At step 668, the personal A/V apparatus receives and stores the game characteristics. The game characteristics can include code which is executed to allow the user to play or otherwise participate in a game.

In an example scenario, a user walks into an alley in a neighborhood and information pop ups on the personal A/V apparatus informing the user this is a play area and asking the user if they want to join in. There is essentially a virtual marker in the alley. In another approach, there is a physical marker such as a sign post that says "This is a game play environment" and this informs the user that a game is available.

FIG. 6K is a flowchart describing example details for transmitting game characteristics to a personal A/V apparatus, in connection with step 612 of FIG. 6A, where the server adjusts the size of a game space based on the number of players. At step 670, a personal A/V apparatus informs a server when joining a game. For example, this can occur as part of step 667 of FIG. 6J. At step 671, the server determines the number of users playing a game, e.g., a particular instance of a game at a particular location. Multiple instances of one game could be played at different locations as well. At step 672, the server adjusts the size of the game space based on the number of users playing the game. For example, the area of a game space can be set to one value if there are five or fewer players, and to a higher value when there are more than five players. This dynamic adjustment can be based on the player/game space size ratio of FIG. 6H, for instance. At step 673, the server pushes an updated game characteristic with the adjusted game space to the personal A/V apparatuses of the players of the game. In this manner, the game space can be sized optimally for the number of players, accommodating both small and large groups. A maximum limit on the number of players in a game can be imposed as well. In some cases, there are teams in a game, and there can be a maximum limit on the number of players in a team, and/or on the number of teams. The updating of a game space could be contingent upon approval by an owner of the game, in one approach, such that the server queries the owner for approval before pushing out the adjusted game space, or the personal A/V apparatus queries the user before executing the adjusted game space. In another approach, a player enters a command to increase the game space without being prompted or queried.

FIG. 6L is a flowchart describing example details for playing a game, in connection with step 618 of FIG. 6A. At step 675, a personal A/V apparatus displays an augmented reality image based on game characteristics. Step 676 monitors a position and conduct (e.g., gestures, speed of movement, time spent at one location) and can also monitor the passage of time (e.g., time of play of a user, time left in the game). Step 677 applies rules of the game based on the position and conduct. For example, a rule may indicate that a user scores a point if the user crosses a boundary. At step 678, the personal A/V apparatus updates the augmented reality image, including the appearance of boundaries, and the appearance and location of virtual objects, based on the current perspective of the user. The augmented reality images can be updated in real time as the user moves to display the game space from the current perspective of the user.

Figure 12:
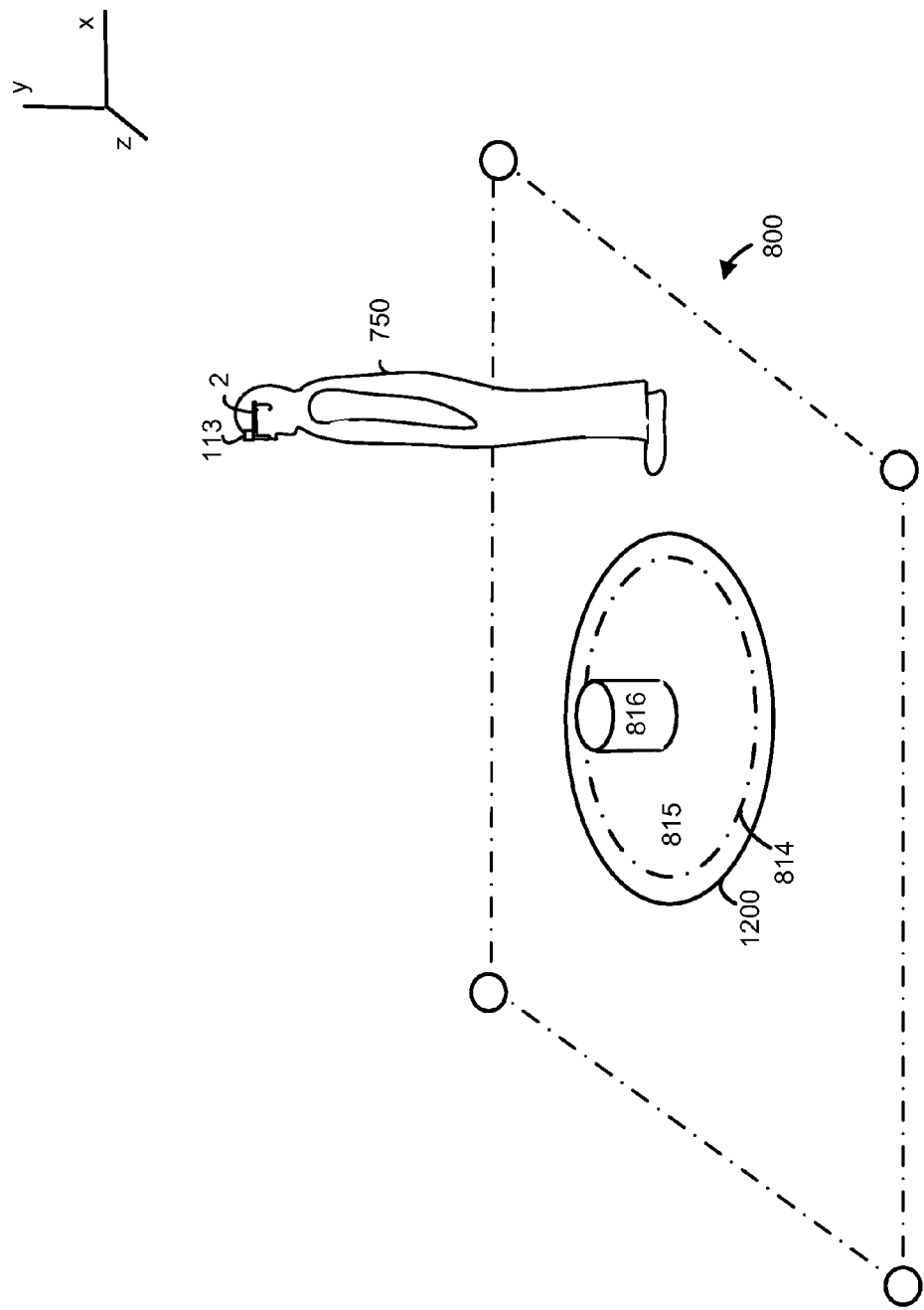
FIG. 12 depicts the game space 800 of FIG. 8A, where the boundary 814 is highlighted by an additional augmented reality image 1200, in response to a determination that the user 750 is close to the boundary 814, in connection with step 683 of FIG. 6L.

For example, the appearance of a boundary may be changed by being highlighted if a user comes near it (or on it, within a specified distance from it, and/or remaining there for a specified amount of time), as depicted by the image 1200 as a highlight of the circular boundary 814 in FIG. 12. Regarding a virtual object, as an example, the lamp 1016 of FIG. 10D may change its appearance by lighting up if a user comes near it and/or performs some gesture such as kicking it (as a variation of the game of kick the can).

Figure 11:
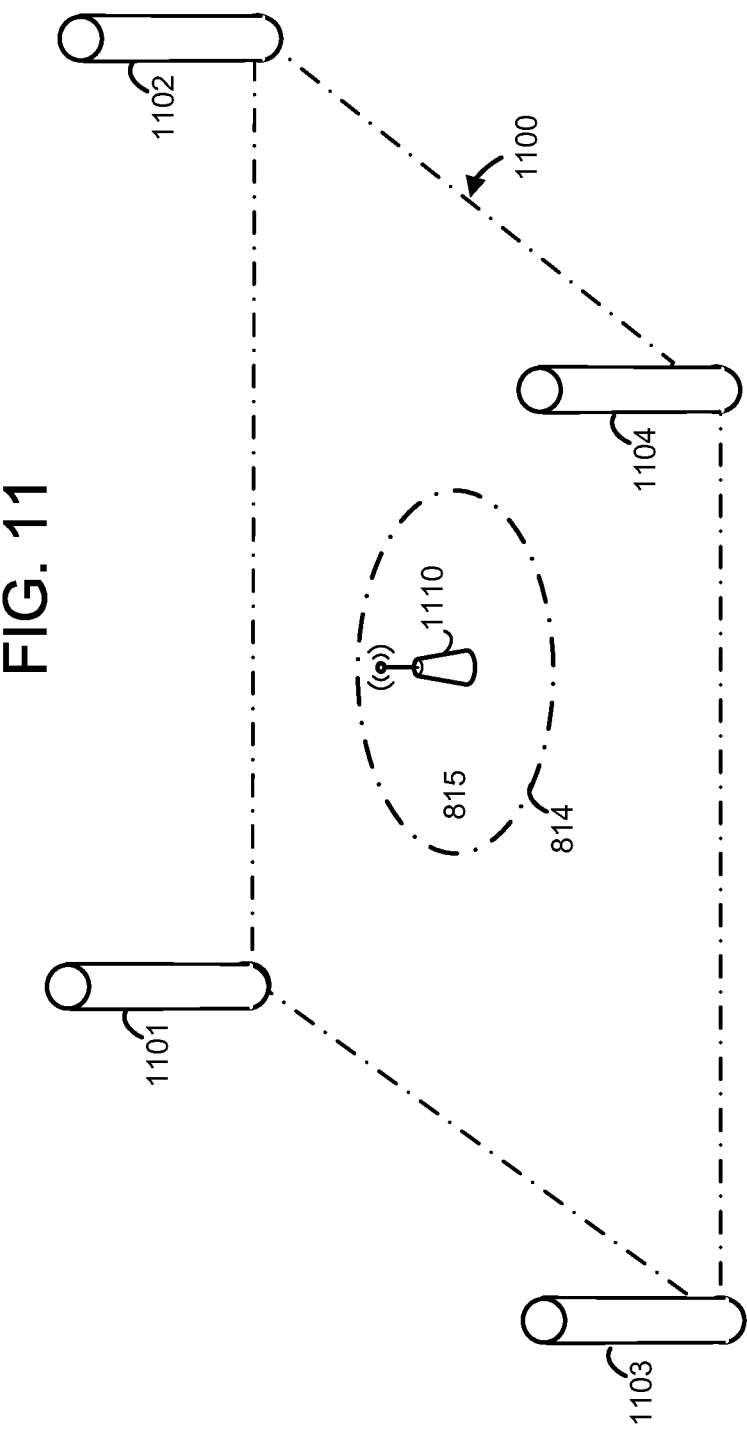
FIG. 11 depicts a game space 1100 which is based on the game space 800 of FIG. 8A, with an RF beacon 1110 replacing the can 816, and virtual posts 1101-1104 added.

FIG. 6M is a flowchart describing example details for monitoring boundaries, in connection with step 620 of FIG. 6A. Step 680 monitors a position/location of a user relative to a boundary. A user's position in a game space can be determined in different ways. In one approach, multiple antennas are positioned around the game space or elsewhere and communicate wirelessly with the personal A/V apparatus, so that an exact location of the personal A/V apparatus and the user can be determined by triangulation. In another approach, the personal A/V apparatus uses GPS data to pinpoint its location. In another approach, the HMDD receives signals from RF beacons which are placed around the game space or other location. FIG. 11 depicts an example beacon 1110 in a game space 1100. The user's position could have a vertical/altitudinal component as well. Decision step 681 determines if a user crosses a boundary or is close to a boundary, within a specified distance. If decision step 681 is false, the monitoring of step 680 continues. If decision step 681 is true, step 682 executes a corresponding rule. For example, a point can be scored for the user or the user's team, the game can end, and so forth. At step 683, the personal A/V apparatus updates an augmented reality image such as to highlight a boundary by changing its visual appearance, providing an audible output such as playing a tone, and/or updating a game status (e.g., a score, points per player, player's turn), based on the rule.

FIG. 6N provides an example database record for storing a game state, in connection with steps 622 and 624 of FIG. 6A. As an example, a game state identifier, status/time remaining, player identifiers, score and next turn, are depicted. For Game1, there is 5 minutes and 30 seconds remaining in the game, the players are user1, user2 and user3, the point score is 5, 2 and 0 points for user1, user2 and user3, respectively, and the next turn is 2, 3 and 1 for user1, user2 and user3, respectively. That is, user3 has the first turn, user1 has the second turn and user2 has the third turn. For instance, this could be used in a baseball game, where the turn represents a batting order for an inning. Game2 and Game3 are inactive in this example.

FIG. 7 depicts a process for tracking a user's gaze direction and depth of focus such as for use in step 602 of FIG. 6A, and step 630 of FIG. 6C. Step 700 involves tracking one or both eyes of a user using the technology described above. In step 702, the eye is illuminated, e.g., using IR light from several LEDs of the eye tracking camera 134 in FIG. 3A. In step 704, the reflection from the eye is detected using one or more IR eye tracking cameras 134. In step 706, the reflection data is provided to the processing unit 4. In step 708, the processing unit 4 determines the position of the eye based on the reflection data, as discussed above. Step 710 determines a gaze direction and a focal distance.

In one approach, the location of the eyeball can be determined based on the positions of the cameras and LEDs. The center of the pupil can be found using image processing, and ray which extends through the center of the pupil can be determined as a visual axis. In particular, one possible eye tracking technique uses the location of a glint, which is a small amount of light that reflects off the pupil when the pupil is illuminated. A computer program estimates the location of the gaze based on the glint. Another possible eye tracking technique is the Pupil-Center/Corneal-Reflection Technique, which can be more accurate than the location of glint technique because it tracks both the glint and the center of the pupil. The center of the pupil is generally the precise location of sight, and by tracking this area within the parameters of the glint, it is possible to make an accurate prediction of where the eyes are gazing.

In another approach, the shape of the pupil can be used to determine the direction in which the user is gazing. The pupil becomes more elliptical in proportion to the angle of viewing relative to the straight ahead direction.

In another approach, multiple glints in an eye are detected to find the Sd location of the eye, estimate the radius of the eye, and then draw a line through the center of the eye through the pupil center to get a gaze direction.

The gaze direction can be determined for one or both eyes of a user. The gaze direction is a direction in which the user looks and is based on a visual axis, which is an imaginary line drawn, e.g., through the center of the pupil to the center of the fovea (within the macula, at the center of the retina). At any given time, a point of the image that the user is looking at is a fixation point, which is at the intersection of the visual axis and the image, at a focal distance from the HMDD. When both eyes are tracked, the orbital muscles keep the visual axis of both eyes aligned on the center of the fixation point. The visual axis can be determined, relative to a coordinate system of the HMDD, by the eye tracker. The image can also be defined relative to the coordinate system of the HMDD so that it is not necessary to translate the gaze direction from the coordinate system of the HMDD to another coordinate system, such as a world coordinate system. An example of a world coordinate system is a fixed coordinate system of a room in which the user is located. Such a translation would typically require knowledge of the orientation of the user's head, and introduces additional uncertainties.

If the gaze direction is determined to point at a certain area in a scene, this indicates that the user is looking at the area. In response, the area could be highlighted by generating an auxiliary reality image, for instance. Moreover, the area and an associated object can be recognized by the forward facing camera of the HMDD, using image recognition techniques.

FIG. 8A depicts an example scenario in which boundaries of a game space 800 are defined. The perspective of the game space is that of a second user 752 in FIG. 8B. The second user 752 has a personal A/V apparatus 754 with a front facing camera 756. One or multiple players can be present in a single game space, playing the same game and interacting with one another. Each player sees the game space from their own perspective and can freely move around the game space. Each user's view of the game space is updated in real time as the physical A/V apparatus moves around (e.g., as the user or their head moves) based on scans of the physical environment. Assume the user 750 is an open outdoor area, such as a grassy field, with a tree 804, for instance. The personal A/V apparatus 2 of the user 750 include the front facing camera 113, and is in communication with the game sharing serve 50 via a network access point 760. A Cartesian coordinate system with x, y and z axes is also depicted. The user is at a point 811 which may be defined as the user's current location. The user gazes with a gaze direction 801 to the tree 804, defining a point 817, e.g., a gazed-upon point of the tree, as discussed in connection with step 633 of FIG. 6C. A line 805 represents a translation of the point 817 down to a point 810 at ground level. The user can also gaze at an area of the ground to define a point, e.g., point 813 by gaze direction 802 and point 812 by gaze direction 803. The points can then be connected by lines 806-809 to define boundary lines, as discussed in connection with step 626 of FIG. 6C.

In this example, the game space can be used for the game of kick the can, where a circular zone 815 is provided in the middle by a boundary line 814. In one approach, the user can define a point at the desired location of the zone 815 by gaze direction or by the user's position, for instance. A circular zone of a specified radius can then be defined relative to the point. In another approach, a game template defines the circular zone 815 automatically after the boundaries 806-809 are defined. In another approach. A game template defines the game space by fitting a template to the two points 810 and 811. An object 816 can be a real object such as a can, or a virtual object. The game space 800 is seen from a perspective of a user other than the user 750 who is standing outside the game space. A user who does not use a personal AN apparatus would not see the virtual boundary lines. In some cases, the virtual boundary lines are coincident with real boundary lines.

In general, different zones of a game space can be defined, such as an infield and outfield of a baseball game, and an end zone of a football field. Another example of a game is a race game in which users can control the movement of virtual cars, or real cars which are remotely controlled or personally driven.

FIG. 8B depicts an augmented reality image of the game space 800 of FIG. 8A from a perspective of the user 750.

FIG. 8C depicts a game space 850 which is based on the game space 800 of FIG. 8A with the addition of a wall 855. A game space can have vertical features such as walls and other structures or objects. In this case, a virtual brick wall 855 is defined to provide a boundary surface of the game space. The players of the game are reminded by the appearance of the wall to stay within the game space. In some cases, an actual wall could be a boundary surface of a game space. The wall can be defined by a command such as "provide brick wall at far end of field. Set height to ten feet." Or, the wall position and size could be defined by a gaze direction, user position or other technique. The virtual brick wall 855 partly obscures a view of a portion of the tree 804 in this example.

FIG. 8D depicts a display screen of a computing device which provides an alternate way for the user to create the game space 800 of FIG. 8A. The computing device 860 can be part of a PC, tablet or laptop, for instance, which allows the user to define a game space using an input device. In this case, the user has defined a rectangular game space 861 with a central circular zone 862, similar to the game space 800 of FIG. 8A.

FIG. 9A depicts an image of an instrumented game space in a physical environment, in connection with step 645 of FIG. 6D. The instrumented game space 900 is a real world baseball field in this example, including a home plate 908, first base 901, pitcher's mound 904, infield 905, outfield 906, first base foul line 902, third base foul line 903 and outfield fence 907. In a coordinate system, the x axis is parallel to the first base foul line 902, the z axis is parallel to the third base foul line 903, and the y axis is vertical. The view is from a perspective of the user 750 and may represent an image which is captured by the forward facing camera 113.

Figure 9B:
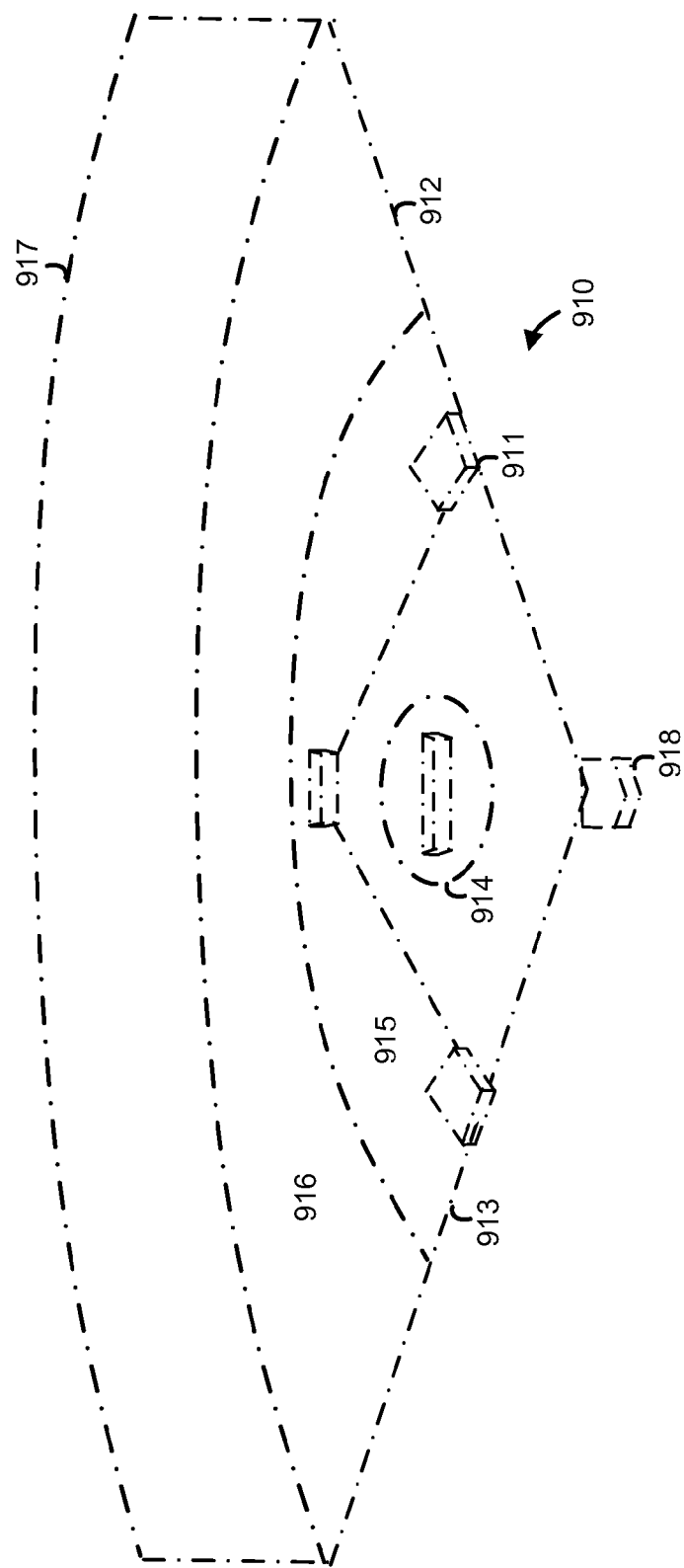
FIG. 9B depicts an augmented reality image of a model 910 of a game space in a virtual environment, corresponding to the image of FIG. 9A.

FIG. 9B depicts an augmented reality image of a model 910 of a game space in a virtual environment, corresponding to the image of FIG. 9A. The model 910 is a virtual game space which matches the lines and features (e.g., bases, outfield fence, pitcher's mound, infield and outfield) of the instrumented game space 900 to provide a model of the real world baseball field. The model includes a home plate 918, first base 911, pitcher's mound 914, infield 915, outfield 916, first base foul line 912, third base foul line 913 and outfield fence 917. Initially, the user may view the model 910 overlaid with the real world baseball field. Subsequently, a user of a game can view the model at any appropriate location, such as an open grassy field.

In this case, a characteristic of the game comprises boundaries in a game space of the game which are defined based on the boundaries in the game space in the physical environment FIG. 9C depicts an example scenario for defining the points 810 and 811 of FIG. 8A, in connection with step 633 in FIG. 6C. Here, the user defines points 810 and 811 to allow the model of the baseball field to be fit to a selected game space area. The boundary line 807 between the points 810 and 811 is used to locate and fit the model. For example, as a default, the first base foul line may be fitted to the boundary line 807 to obtain the result of FIG. 9D. The user can enter a command such as "Fit baseball field to line" or "Fit baseball field using first base foul line."

FIG. 9D depicts an example augmented reality image 950 of the model 910 of a game space which is fitted to a physical environment based on the points 810 and 811, in connection with step 641 of FIG. 6C. Home plate 918 is located at the point 811 and the end of the first base foul line is located at the point 810. With these definitions, the remainder of the baseball field game space can be defined as indicated. The game space is seen from a perspective of a user other than the user 750 who is standing outside the game space.

In this case, the boundaries in the game space of the game are set based on fitting the boundaries in the game space in the physical environment relative to one or more points.

Note that a camera of one user can be used to record the movement and position of another user, and this recording can be played back to settle disputes about what has occurred in a game. For example, there may be a dispute about whether a first player has touched first base with his or her foot while running the bases. Moreover, if the game space is coincident with an instrumented court, the issue of whether the first user has touched a real first base can similarly be settled. In some cases, the cameras of multiple users capture the movement and position of another user to allow viewing from different perspectives.

FIG. 10A depicts an example scenario in which a user obtains an image of an object in a physical environment, in connection with step 650 of FIG. 6E. In this case, the user 750 decides it would be amusing to use a virtual lamp in the game of kick the can, so that the game becomes "kick the lamp." The front-facing camera 113 captures an image 1011 (FIG. 10B) of a scene which includes the lamp 1002 on a table 1010. Lines 1001 and 1003-1005 are boundaries of the field of view of the front-facing camera.

FIG. 10B depicts an image 1011 of the object 1002 of FIG. 10A. FIG. 10C depicts a virtual object 1016 based on the object 1002 of FIG. 10B, in connection with step 651 of FIG. 6E. FIG. 10D depicts a game space 1050 which is based on the game space 800 of FIG. 8A, with the virtual object 1016 replacing the can 816. This approach allows users to create their own virtual objects that can be incorporated into a game. Behaviors can be associated with a virtual object based on conduct of the players. For example, if a player makes a kicking motion near the lamp, the lamp can begin moving through the air as if it were a real world object that was kicked. Or, the lamp can light up. As another example, a user could scan a baseball bat and make a baseball like game out of that scan. A virtual bat could be used to hit a virtual ball in a game space that it a virtual baseball field. See also FIGS. 14A and 14B.

FIG. 11 depicts a game space 1100 which is based on the game space 800 of FIG. 8A, with an RF beacon 1110 replacing the can 816, and virtual posts 1101-1104 added. In this case, the boundary 814 is not necessarily visible as an augmented reality image, but may represent a range of a certain distance from the RF beacon 1110. Generally, wireless transmitting devices may be used to define areas and boundaries of a game space, taking advantage of the full sensing capabilities of a personal A/V apparatus. This can be used to provide guidance to a user in the game space, such as to inform the user if he or she is near a boundary or is in a certain zone of a game space. The wireless transmitting devices can be in the form of BLUETOOTH®- or WI-FI®-enabled cones or pylons, for instance, which are placed by the user at desired locations in a game space.

FIG. 12 depicts the game space 800 of FIG. 8A, where the boundary 814 is highlighted by an additional augmented reality image 1200, in response to a determination that the user 750 is close to the boundary 814, in connection with step 683 of FIG. 6L. A boundary can be visually highlighted in different ways, such as by changing its color or thickness, flashing, or by providing an additional boundary line. As mentioned, in one approach, a boundary line is highlighted based on a user's position relative to the line. In this example, the position of the user 750 is determined to be close to the boundary line 814, in response to which the additional augmented reality image 1200 is provided. Other feedback such as an audio output (e.g., a warning buzzer) can also be provided by the personal A/V apparatus based on a user's position relative to boundary.

Figure 13:
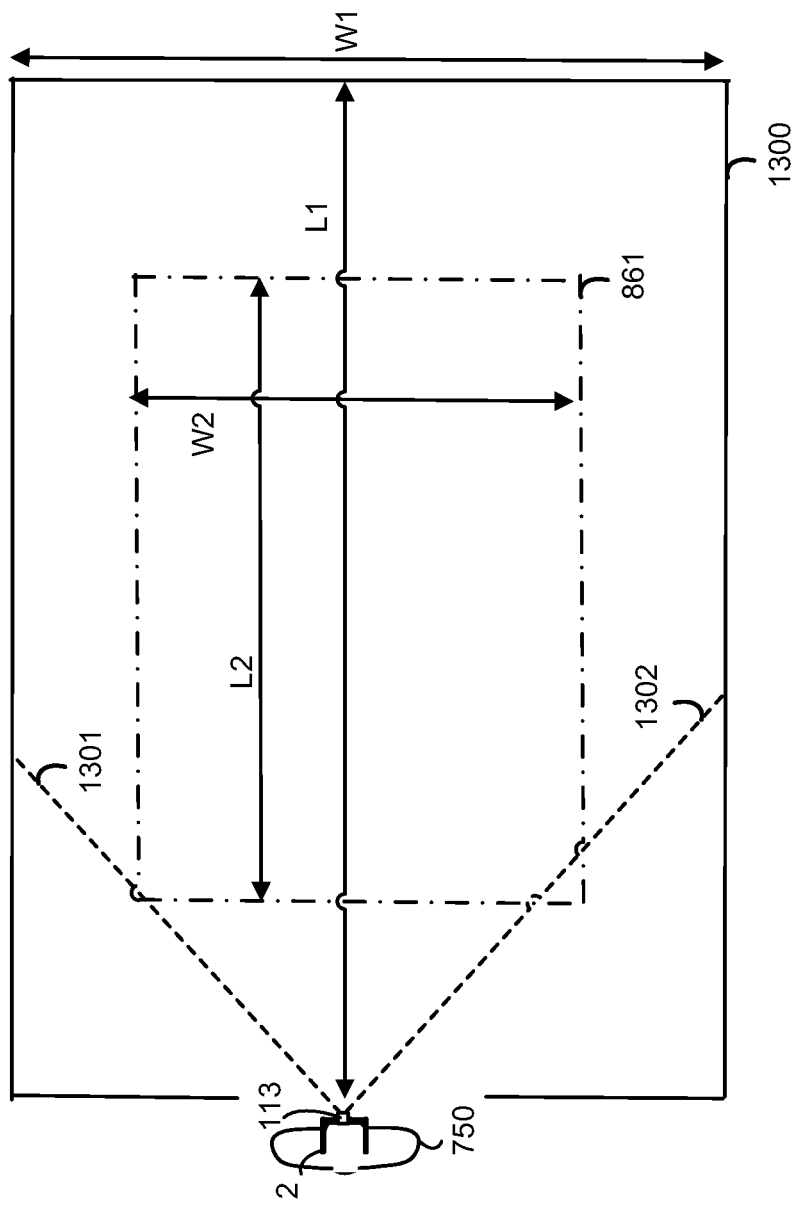
FIG. 13 depicts measurement of a size of an area of a game space using a personal A/V apparatus, in connection with step 646 of FIG. 6E.

FIG. 13 depicts measurement of a size of an area of a game space using a personal A/V apparatus, in connection with step 646 of FIG. 6E. A room 1300, seen from an overhead perspective, has a length L1 and a width W1. A game space 861 has a length L2 and a width W2. The user 750 stands in a doorway of the room, for instance, facing toward the room, to allow the front-facing camera 113 to capture a depth image. Lines 1301 and 1302 are boundary lines of the field of view of the camera. The depth image can be processed to determine distances from the user to the various walls in the room, allowing a determination of the room's dimensions. In one approach, the game space 861 is displayed to the user as an augmented reality image so the user can see how the game space fits into the room.

Figure 14A:
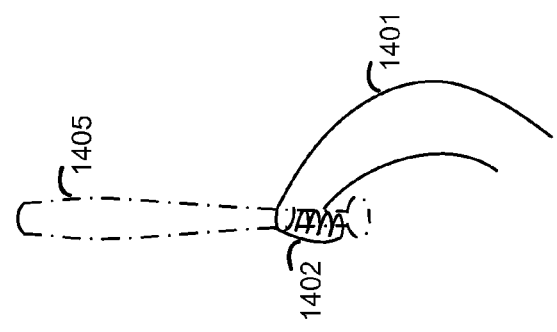
FIG. 14A depicts a view of a user 750 holding a virtual object 1305 in the form of a bat, from a perspective of another user.

FIG. 14A depicts a view of a user 750 holding a virtual object 1305 in the form of a bat, from a perspective of another user. The user 750 has an arm 1401 and hand 1402 which appear to hold a virtual object 1405 in the form of a baseball bat.

Figure 14B:
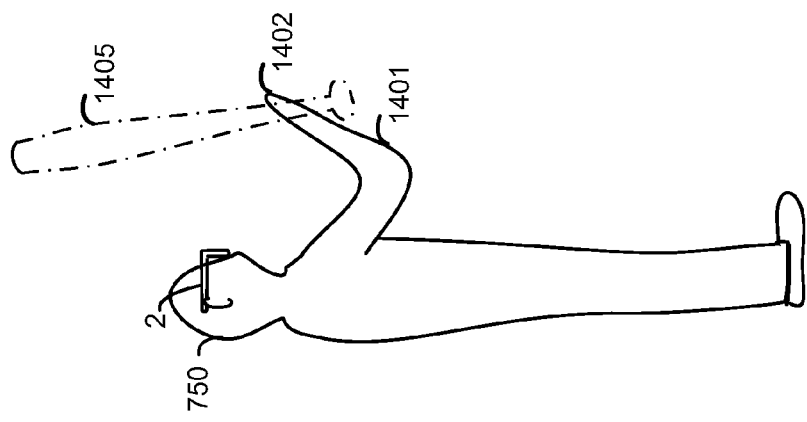
FIG. 14B depicts a view of the arm 1301 and hand 1302 of the user 750 of FIG. 14A, with the virtual object 1405, from a perspective of the user 750.

FIG. 14B depicts a view of the arm 1301 and hand 1302 of the user 750 of FIG. 14A, with the virtual object 1405, from a perspective of the user 750. Such virtual objects can be defined by a user or included as part of a game, In this case, the virtual bat could be used to hit a virtual ball in a game space that it a virtual baseball field The example computer systems illustrated in the figures include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

The above discussion describes many different ideas. Each of these ideas can be combined with the other above-described ideas such that a personal A/N apparatus and accompanying system can be designed to implement all of the ideas discussed above, or any subset of the ideas.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for sharing a game, comprising:
    receiving a command from a first user via a first head-mounted display device to set one point of a boundary line of a game space of a game, the game space is in a physical environment;
    in response to the command to set the point, displaying, via the first head-mounted display device, an augmented reality image identifying the one point to the first user in the physical environment;
    sharing the augmented reality image identifying the one point in real-time, via a network, with a second head-mounted display device of a second user;
    displaying an augmented reality image identifying another point of the boundary line via the first head-mounted display device in real-time in response to a command from the second user via the second head-mounted display device to set the another point of the boundary line, so that points and boundary lines of the game space are defined by multiple users including the first user and the second user in a collaborative manner while the first user and the second user see the points and boundary lines which are being defined in the physical environment using the first and second head-mounted display device, respectively; and
    during playing of the game by the first user, displaying an augmented reality image comprising the boundary line.

2. The method of claim 1, further comprising:
    capturing an image of the physical environment; and
    using the image of the physical environment to provide a model of the game space of the game.

3. The method of claim 1, further comprising:
    setting a desired size of the game space of the game;
    determining a size of the physical environment; and
    determining whether the size of the physical environment is suitable for the desired size of the game space.

4. The method of claim 1, further comprising:
    receiving commands from the first user via the first head-mounted display device and from the second user via the second head-mounted display device to set the points of the game space, the points include the one point and the another point;
    joining the points together; and
    setting the boundary line in the game space of the game by fitting boundary lines in the game space in the physical environment relative to the points.

5. The method of claim 1 wherein the one point is above a ground surface in the physical environment, and the method performed further comprises:
    translating the one point above the ground surface to the ground surface to define the boundary line.

6. The method of claim 1, wherein:
in the sharing, the second head-mounted display device displays the augmented reality image identifying the one point via the second head-mounted display device.

7. The method of claim 1, wherein:
the one point is defined as a point in the physical environment at which the first user is gazing according to a respective gaze direction while respective commands of the first user are made to set and then accept the point; and
the another point is defined as a point in the physical environment at which the second user is gazing according to a respective gaze direction while respective commands of the second user are made to set and then accept the point.

8. The method of claim 1, further comprising:
in response to the sharing of the augmented reality image, receiving a request via the first head-mounted display device for the first user to re-define the one point, the request is from the second user.

9. A head-mounted display device, comprising:
a communication interface;
an augmented reality projection system;
a location detection system which detects a location of the head-mounted display device; and
at least one control circuit in communication with the communication interface, the augmented reality projection system and the location detection system, the at least one control circuit is configured to:
periodically inform a server of the location of the head-mounted display device;
when the location of the head-mounted display device indicates that a user of the head-mounted display device has walked into a location of a game, receive a communication from the server over a network, via the communication interface, the communication comprises a request asking if the user desires to play the game, the communication is made based on a determination that the user is eligible to play the game based on the user subscribing to an augmented reality gaming service and having a certain skill level which is set by an owner of the game, wherein permission to play the game is restricted to users with the certain skill level who subscribe to the augmented reality gaming service;
communicate acceptance of the request;
receive a transmission of code from the server over the network, via the communication interface, the code comprising a rule of the game and a game space of the game; and
execute the code, the code controls the augmented reality projection system to provide augmented reality images which display the game space of the game to the user and allow the user to begin to participate in the game in accordance with the rule.

10. The head-mounted display device of claim 9, wherein:
the code comprises a boundary of the game space;
the rule of the game is based on a position of the user in the game space relative to the boundary; and
the at least one control circuit, in communication with the location detection system, is configured to determine a position of the user relative to the boundary, and updates a status of the game based on the position of the user relative to the boundary, the status comprises at least one of a score, points per player or player's turn in the game.

11. The head-mounted display device of claim 9, wherein:
the at least one control circuit is configured to communicate a state of the game to a server, the state indicates a status of the user in the game, the status comprises at least one of a score, points per player or player's turn in the game.

12. The head-mounted display device of claim 9, wherein:
the communication identifies the owner of the game;
the acceptance is subject to a condition regarding the owner of the game; and
the communication of the acceptance of the request is responsive to a determination that the condition is met regarding the owner of the game.

13. The head-mounted display device of claim 9, wherein:
the code sets a role for the user in the game.

14. The head-mounted display device of claim 9, wherein:
the code sets a position for the user in a field.

15. A method for sharing a game, comprising:
obtaining images of a physical environment comprising an instrumented court using cameras of head-mounted display devices of different users, the different users comprising a first user using a first head-mounted display device and a second user using a second head-mounted display device, and the cameras of the different users having different perspective views of the physical environment;
processing the images, the processing the images comprises detecting lines on the instrumented court;
based on the processing of the images, creating one model of the lines by converting positions of the line in 3D space to a model which can be represented as an augmented reality image, the one model corresponds to the instrumented court and provides a game space of a game;
displaying the game space provided by the one model to the first user to allow the first user to confirm whether the game space provided by the one model accurately matches the instrumented court;
if the user confirms that the game space provided by the one model accurately matches the instrumented court, sharing the game, including the one model, with at least a second user of a second head-mounted display device via a network; and
during playing of the game by the first user and the second user, displaying the augmented reality image to the first user via the first head-mounted display device.

16. The method of claim 15, wherein:
the detecting comprises detecting painted lines on a floor.

17. The method of claim 15, wherein:
the detecting comprises detecting chalk lines on a field.

18. The method of claim 15, wherein:
the instrumented court comprises at least one of a basketball court, volleyball court, baseball field or a football field.

19. The method of claim 15, wherein:
the lines are boundary lines on the instrumented court.

20. The method of claim 15, further comprising:
if the user does not confirm that the game space provided by the one model accurately matches the instrumented court, capturing and processing another image of the instrumented court to provide another model of the lines.

* * * * *